(12) United States Patent
Ueno et al.

(10) Patent No.: US 8,319,898 B2
(45) Date of Patent: Nov. 27, 2012

(54) EDGE ENHANCEMENT METHOD AND APPARATUS

(75) Inventors: Masafumi Ueno, Osaka (JP); Kenichiroh Yamamoto, Osaka (JP); Takashi Yoshii, Osaka (JP); Hiroyuki Furukawa, Osaka (JP); Yasuhiro Yoshida, Osaka (JP); Ikuko Tsubaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 480 days.

(21) Appl. No.: 12/530,145

(22) PCT Filed: Apr. 18, 2008

(86) PCT No.: PCT/JP2008/057631
§ 371 (c)(1),
(2), (4) Date: Sep. 4, 2009

(87) PCT Pub. No.: WO2008/136289
PCT Pub. Date: Nov. 13, 2008

(65) Prior Publication Data
US 2010/0110300 A1 May 6, 2010

(30) Foreign Application Priority Data

Apr. 27, 2007 (JP) ................................ 2007-118108
Mar. 10, 2008 (JP) ................................ 2008-059354

(51) Int. Cl.
*H04N 5/21* (2006.01)
(52) U.S. Cl. ........ 348/625; 348/627; 348/606; 348/699; 348/701; 382/266; 358/3.27
(58) Field of Classification Search .................. 348/625, 348/627, 606, 607, 620, 699, 700, 701; 382/266, 382/275; 375/240.27, 240.16; 345/611; 358/447, 3.27
See application file for complete search history.

(56) References Cited

U.S. PATENT DOCUMENTS 6,147,714 A 11/2000 Terasawa et al.
(Continued)

FOREIGN PATENT DOCUMENTS

EP 1 256 928 A2 11/2002
(Continued)

OTHER PUBLICATIONS

Ishiguro et al., "Consideration on Motion Picture Quality of the Hold Type Display with an octuple-rate CRT", Technical Report of IEICE, The Institute of Electronics, Information and Communication Engineers, EID96-4, (Jun. 1996), pp. 19-26.
(Continued)

*Primary Examiner* — Jefferey Harold
*Assistant Examiner* — Jean W Desir
(74) *Attorney, Agent, or Firm* — Birch Stewart Kolasch & Birch, LLP

(57) ABSTRACT

An image processing device, method, an image display device and method which can obtain a high-definition display image by properly controlling processing of reducing the blur of a displayed image caused by the time integration effect of an image sensor. The image display device comprises a motion detection part (1) which detects the moving amount of an input image signal, and an edge emphasis part (2) which subjects the input image signal to edge emphasis processing, and the image display device increases an edge emphasis degree of edge emphasis processing to an area where the moving amount of the input image signal is large. The image display device comprises a genre judgment part (3) which judges the genre classification which the input image signal is connected with according to genre information obtained from outside of the device, and a control part (4) which controls the edge emphasis part (2) to reduce the edge emphasis degree of the edge emphasis processing or to avoid the edge emphasis processing even in the area where the moving amount of the input signal is large when the input image signal is connected with a predetermined genre.

8 Claims, 15 Drawing Sheets

U.S. PATENT DOCUMENTS

| | | | |
|---|---|---|---|
| 6,930,752 B2 * | 8/2005 | Baba et al. ............... 352/38 |
| 2002/0180812 A1 | 12/2002 | Kim et al. | |
| 2004/0062450 A1 | 4/2004 | Kondo et al. | |
| 2004/0160577 A1 | 8/2004 | Baba et al. | |
| 2005/0270382 A1 | 12/2005 | Kurumisawa | |
| 2006/0007358 A1 | 1/2006 | Kim | |
| 2006/0061690 A1 | 3/2006 | De Haan et al. | |
| 2006/0146168 A1 | 7/2006 | Nishi et al. | |
| 2007/0070221 A1 | 3/2007 | Nishi et al. | |

FOREIGN PATENT DOCUMENTS

| | | |
|---|---|---|
| JP | 1-215185 A | 8/1989 |
| JP | 8-279950 A | 10/1996 |
| JP | 09-37181 | 2/1997 |
| JP | 11-122510 A | 4/1999 |
| JP | 2000-101871 A | 4/2000 |
| JP | 2000-156816 A | 6/2000 |
| JP | 2000-224472 A | 8/2000 |
| JP | 2002-55856 | 2/2002 |
| JP | 3295437 B2 | 6/2002 |
| JP | 2002-373330 A | 12/2002 |
| JP | 2004-48172 A | 2/2004 |
| JP | 2004-80252 A | 3/2004 |
| JP | 2005-348355 A | 12/2005 |
| JP | 2006-330306 | 12/2006 |
| JP | 2006-330306 A | 12/2006 |
| JP | 2007-20140 A | 1/2007 |
| WO | WO 03/100722 A1 | 12/2003 |

OTHER PUBLICATIONS

Tatsuro Yamauchi, "TV Standards Conversion", Journal of the Institute of Television Engineers of Japan, 1991, vol. 45, No. 12, pp. 1534-1543.

* cited by examiner

FIG. 7
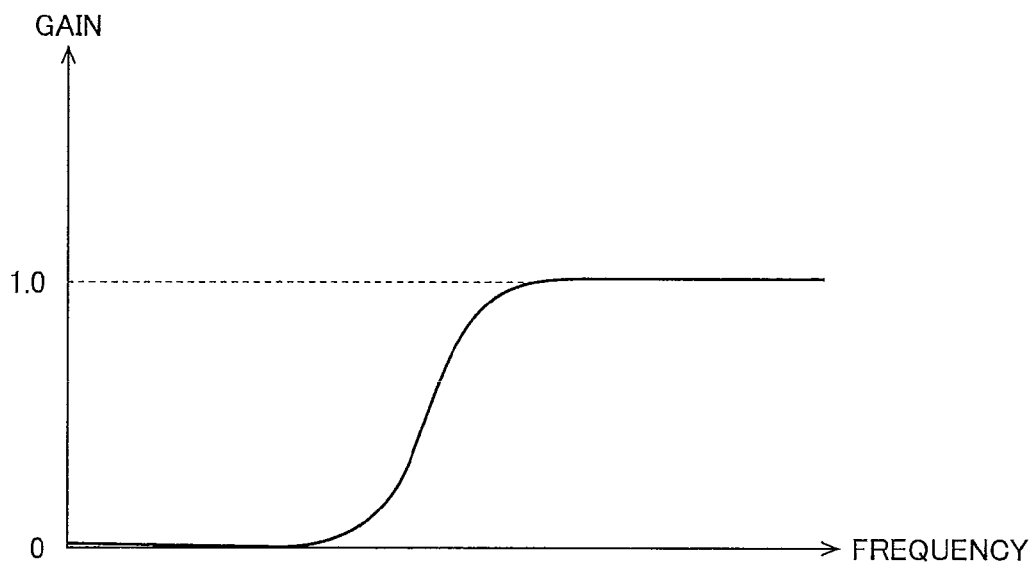
(a)
MOTION AMOUNT=SMALL
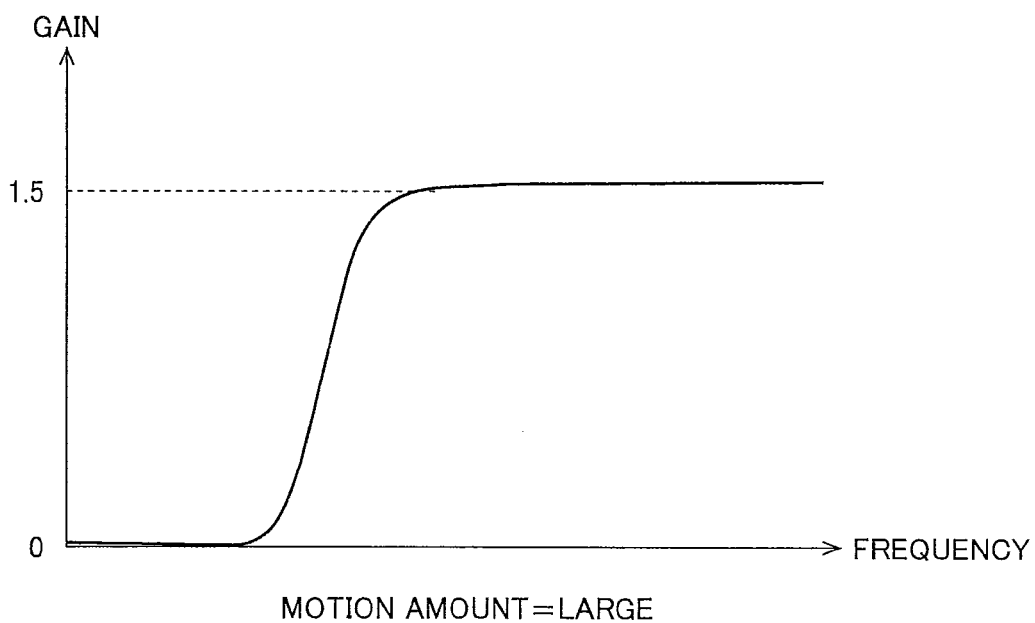
(b)
MOTION AMOUNT=LARGE

FIG. 9
(a)
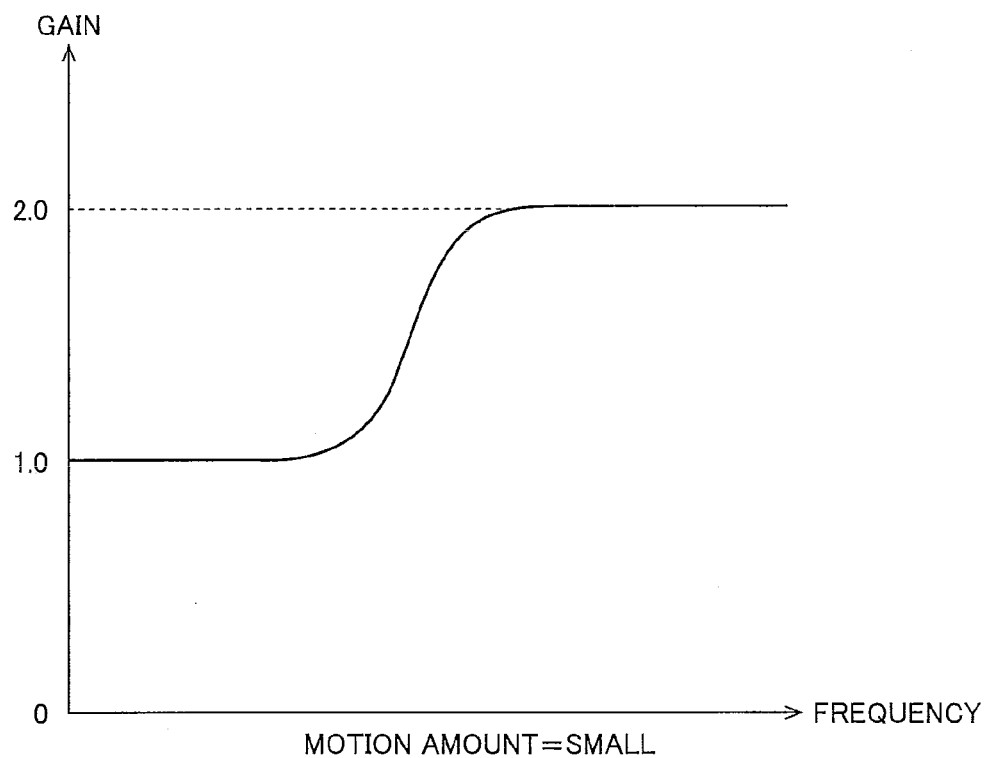
MOTION AMOUNT=SMALL
(b)
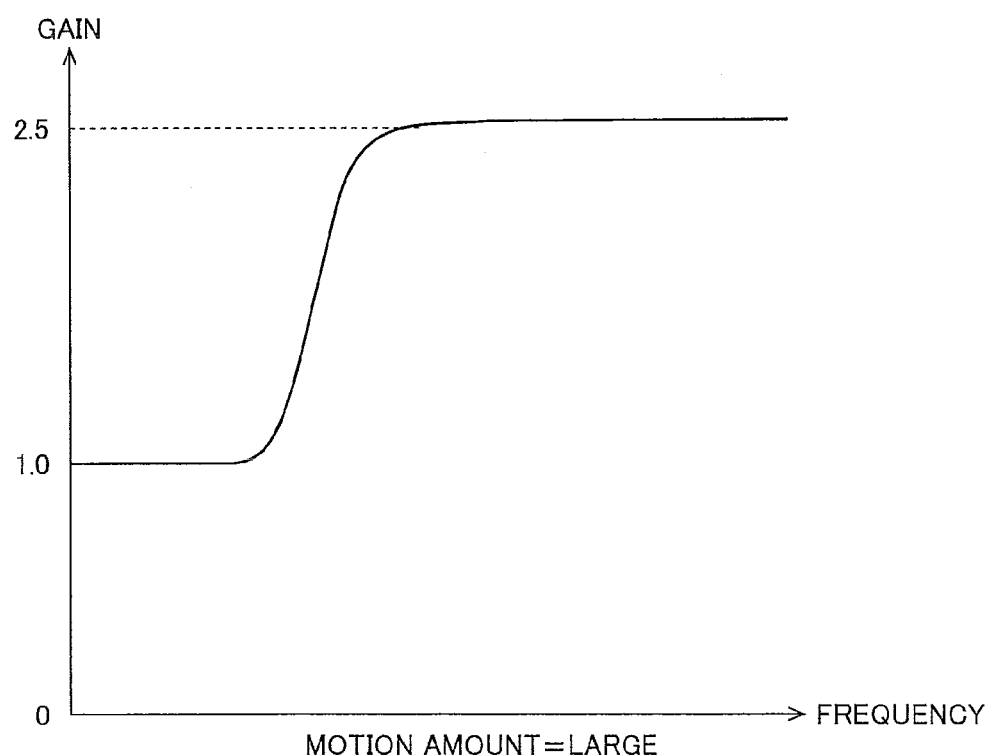
MOTION AMOUNT=LARGE

EDGE ENHANCEMENT METHOD AND APPARATUS

TECHNICAL FIELD

The present invention relates to an image display device and an image display method of the device capable of presenting a high-definition displayed video by reducing motion blurs of a displayed video due to the time integration effect of an image sensor.

BACKGROUND OF THE INVENTION

As compared to conventional cathode-ray tubes (CRTs) primarily used for realizing moving images, LCDs (Liquid Crystal Displays) have a drawback, so-called motion blur, which is the blurring of outline of a moving portion perceived by a viewer when displaying an image with movement. It is indicated that this motion blur arises from the LCD display system itself (see e.g., Specification of Japanese Patent No. 3295437; "Hidekazu Ishiguro and Taiichiro Kurita, "Consideration on Motion Picture Quality of the Hold Type Display with an octuple-rate CRT", IEICE Technical Report, Institute of Electronics, Information and Communication Engineers, EID96-4 (1996-06), p. 19-26").

Since fluorescent material is scanned by an electron beam to cause emission of light for display in CRTs, the light emission of each pixel is basically impulse-like although slight afterglow of the fluorescent material exists. This is called an impulse-type display system. On the other hand, in the case of LCDs, an electric charge accumulated by applying an electric field to liquid crystal is retained at a relatively high rate until the next electric field is applied. Especially, in the case of the TFT system, since a TFT switch is disposed for each dot configuring a pixel and usually each pixel is provided with an auxiliary capacity, the ability to retain the accumulated charge is extremely high. Therefore, the light emission is continued until the pixels are rewritten by the application of the electric field based on the image information of the next frame or field (hereinafter, represented by the frame). This is called a holding-type display system.

Since the impulse response of the image displaying light has a temporal spread in the above holding-type display system, special frequency characteristics deteriorate as temporal frequency characteristics deteriorate, and the motion blur occurs. Since the human eye can smoothly follow a moving object, if the light emission time is long as in the case of the holding type, the movement of image looks jerky and unnatural due to the time integration effects.

To improve the motion blur in the above holding-type display system, a technique for converting a frame rate (number of frames) by interpolating an image between frames is known. This technique is called FRC (Frame Rate Converter) and is put to practical use in liquid crystal display devices, etc.

Conventionally known methods of converting the frame rate include various techniques such as simply repeating readout of the same frame for a plurality of times and frame interpolation using linear interpolation between frames (see e.g., Tatsuro Yamauchi, "TV Standards Conversion", Journal of the Institute of Television Engineers of Japan, Vol. 45, No. 12, pp. 1534-1543 (1991)). However, in the case of the frame interpolation processing using the linear interpolation, unnaturalness of motion (jerkiness, judder) is generated due to the frame rate conversion, and the motion blur disturbance due to the holding-type display system cannot sufficiently be improved, resulting in inadequate image quality.

To eliminate effects of the jerkiness, etc., and improve quality of moving images, a motion-compensated frame interpolation processing using motion vectors has been proposed. Since a moving image itself is captured to compensate the image movement in this process, highly natural moving images may be acquired without deteriorating the resolution and generating the jerkiness. Since interpolation image signals are generated with motion compensation, the motion blur disturbance due to the above holding-type display system may sufficiently be improved.

Above Specification of Japanese Patent No. 3295437 discloses a technology of motion-adaptively generating interpolation frames to increase a frame frequency of a displayed image for improving deterioration of spatial frequency characteristics causing the motion blur. In this case, at least one interpolation image signal interpolated between frames of a displayed image is motion-adaptively created from the previous and subsequent frames, and the created interpolation image signals are interpolated between the frames and are sequentially displayed.

FIG. 1 is a block diagram of a schematic configuration of an FRC drive display circuit in a conventional liquid crystal display device and, in FIG. 1, the FRC drive display circuit includes an FRC portion 100 that converts the number of frames of the input image signal by interpolating the image signals subjected to the motion compensation processing between frames of the input video signal, an active-matrix liquid crystal display panel 203 having a liquid crystal layer and an electrode for applying the scan signal and the data signal to the liquid crystal layer, and an electrode driving portion 204 for driving a scan electrode and a data electrode of the liquid crystal display panel 203 based on the image signal subjected to the frame rate conversion by the FRC portion 100.

The FRC portion 100 includes a motion vector detecting portion 101 that detects motion vector information from the input image signal and an interpolation frame generating portion 102 that generates interpolation frames based on the motion vector information acquired by the motion vector detecting portion 101.

In the above configuration, for example, the motion vector detecting portion 101 may obtain the motion vector information with the use of a block matching method, a gradient method, etc., or if the motion vector information is included in the input image signal in some form, this information may be utilized. For example, the image data compression-encoded with the use of the MPEG format includes motion vector information of a moving image calculated at the time of encoding, and this motion vector information may be acquired.

FIG. 2 is a diagram for explaining frame rate conversion processing by the conventional FRC drive display circuit shown in FIG. 1. The FRC portion 100 generates interpolation frames (gray-colored images in FIG. 2) between frames with the motion compensation processing using the motion vector information output from the motion vector detecting portion 101 and sequentially outputs the generated interpolation signals along with the input frame signals to perform processing for converting the frame rate of the input image signal from 60 frames per second (60 Hz) to 120 frames per second (120 Hz).

FIG. 3 is a diagram for explaining an interpolation frame generation processing of the motion vector detecting portion 101 and the interpolation frame generating portion 102. The motion vector detecting portion 101 uses the gradient method to detect a motion vector 205 from, for example, a frame #1 and a frame #2 shown in FIG. 2. The motion vector detecting portion 101 obtains the motion vector 205 by measuring a direction and an amount of movement in ⅟₆₀ of a second between the frame #1 and the frame #2. The interpolation frame generating portion 102 then uses the obtained motion vector 205 to allocate an interpolation vector 206 between the frame #1 and the frame #2. An interpolation frame 207 is generated by moving an object (in this case, an automobile) from a position of the frame #1 to a position after ⅟₁₂₀ of a second based on the interpolation vector 206.

By performing the motion-compensated frame interpolation processing with the use of the motion vector information to increase a display frame frequency in this way, the display state of the LCD (the holding-type display system) can be made closer to the display state of the CRT (the impulse-type display system) and the image quality deterioration may be improved which is due to the motion blur generated when displaying a moving image.

In the motion-compensated frame interpolation processing, it is essential to detect the motion vectors for the motion compensation. For example, the block matching method and the gradient method are proposed as representative techniques for the motion vector detection. In the gradient method, the motion vector is detected for each pixel or small block between two consecutive frames to interpolate each pixel or small block of the interpolation frame between two frames. An image at an arbitrary position between two frames is interpolated at an accurately compensated position to convert the number of frames.

Although the image quality deterioration due to the motion blur caused by the holding-type display may be improved by performing the motion-compensated frame interpolation processing to increase a display frame frequency as above, the input image signal may include motion blurs due to the time integration effect of an image sensor (also called a camera blur), and the image quality is deteriorated by the motion blurs due to the time integration effect of an image sensor. Therefore, for example, a proposal has been made in Japanese Laid-Open Patent Publication No. 2002-373330 for an image processing device removing the motion blurs due to the time integration effect of an image sensor and increasing the feeling resolution without making images unnatural. The conventional image processing device described in Japanese Laid-Open Patent Publication No. 2002-373330 will hereinafter be described with reference to FIG. 4.

FIG. 4 is a functional block diagram of a configuration of a conventional image processing device. An input image supplied to the image processing device is supplied to an object extracting portion 111, an area identifying portion 113, a mixture ratio calculating portion 114, and a foreground/background separating portion 115. The object extracting portion 111 roughly extracts an image object corresponding to a foreground object included in the input image and supplies the extracted image object to a motion detecting portion 112. For example, the object extracting portion 111 roughly extract the image object corresponding to the foreground object by detecting the contour of the image object corresponding to the foreground object included in the input image.

The object extracting portion 111 roughly extracts an image object corresponding to a background object included in the input image and supplies the extracted image object to the motion detecting portion 112. For example, the object extracting portion 111 roughly extracts the image object corresponding to the background object from a difference between the input image and the image object corresponding to the extracted foreground object. For example, the object extracting portion 111 may roughly extract the image object corresponding to the foreground object and the image object corresponding to the background object from a difference between a background image stored in a background memory disposed inside and the input image.

The motion detecting portion 112 uses methods such as a block matching method, a gradient method, a phase correlation method, and a pel-recursive method to calculate a motion vector of the roughly extracted image object corresponding to the foreground object and supplies the calculated motion vector and the position information of the motion vector (information identifying a position of a pixel corresponding to the motion vector) to the area identifying portion 113 and a motion blur removing portion 116. The motion vector output by the motion detecting portion 112 includes information corresponding to a motion amount v. For example, the motion detecting portion 112 may output a motion vector of each of the image objects to the motion blur removing portion 116 along with the pixel position information identifying pixels for the image objects.

The motion amount v is a value representative of a change in a position of an image corresponding to a moving object on the basis of a pixel interval. For example, if an image of an object corresponding to the foreground moves to be displayed at a position four pixels away in the next frame based on a certain frame, the motion amount v of the image of the object corresponding to the foreground is represented by four.

The area identifying portion 113 identifies the respective pixels of the input image as a foreground area, a background area, and a mixture area and supplies information (hereinafter, area information) indicative of which of the foreground area, the background area, or the mixture area each of the pixels belongs to, to the mixture ratio calculating portion 114, the foreground/background separating portion 115, and the motion blur removing portion 116.

The mixture ratio calculating portion 114 calculates a mixture ratio (hereinafter, a mixture ratio α) corresponding to the pixels included in the mixture area based on the input image and the area information supplied from the area identifying portion 113 and supplies the calculated mixture ratio to the foreground/background separating portion 115. The mixture ratio α is a value indicative of a rate of an image component (hereinafter, also referred to as a background component) corresponding to the background objects.

The foreground/background separating portion 115 separates the input image into a foreground component image consisting only of image components (hereinafter, also referred to as foreground components) corresponding to the foreground objects and a background component image consisting only of background components based on the area information supplied from the area identifying portion 113 and the mixture ratio α supplied from the mixture ratio calculating portion 114 and supplies the foreground component image to the motion blur removing portion 116 and the background component image to a correcting portion 117.

The motion blur removing portion 116 determines a unit of processing indicative of one or more pixels included in the foreground component image based on the motion amount v known from the motion vector and the area information. The unit of processing is data that specifies a group of pixels to be processed for adjustment of a motion blur amount. The motion blur removing portion 116 removes the motion blur included in the foreground component image based on the foreground component image supplied from the foreground/background separating portion 115, the motion vector and the position information thereof supplied from the motion detecting portion 112, and the unit of processing and outputs the foreground component image after the removal of the motion blur to a motion blur removed image processing portion 118.

The correcting portion 117 corrects a pixel value of a pixel corresponding to the mixture area in the background component image. A pixel value of a pixel corresponding to the mixture area in the background component image is calculated by removing the foreground component from a pixel value of a pixel of the mixture area before the separation. Therefore, a pixel value of a pixel corresponding to the mixture area in the background component image is reduced correspondingly to the mixture ratio α as compared to a pixel value of a pixel of the adjacent background area. The correcting portion 117 corrects such gain reduction corresponding to the mixture ratio α of a pixel value of a pixel corresponding to the mixture area in the background component image and supplies the corrected background component image to the motion blur removed image processing portion 118.

The motion blur removed image processing portion 118 applies an edge enhancement processing at a different edge enhancement level to each of the foreground component image after the removal of the motion blur and the corrected background component image. For the background component image, which is a still image, the edge enhancement processing is executed to enhance the edges more than the foreground component image. This enables an increase in the feeling resolution of the background component image without generating the unnatural image deterioration at the time of application of the edge enhancement processing to an image including noises.

On the other hand, for the foreground component image, the edge enhancement processing is executed at a lower edge enhancement level as compared to the background component image. This enables the reduction of the unnatural image deterioration while improving the feeling resolution even if the foreground component image after the removal of the motion blur includes noises.

DISCLOSURE OF THE INVENTION

Problems to be Solved by the Invention

However, it is problematic that the image processing device described in Japanese Laid-Open Patent Publication No. 2002-373330 needs the motion blur removing portion 116 for removing motion blurs included in the foreground component image and the correcting portion 117 that corrects pixel values of pixels corresponding to the mixture area, resulting in a very complicated processing/structure. Although this image processing device is able to remove motion blurs due to the time integration effect of an image sensor from an image having a foreground object moving relative to a still background, the image processing device is unable to remove motion blurs in other cases, for example, from an image having not only a moving image of a foreground object but also a background image moving. It is not practical if the desired effect is limited and acquired only from certain image contents as above.

It is also problematic that the image processing device described in Japanese Laid-Open Patent Publication No. 2002-373330 is unable to sufficiently improve the feeling resolution of the foreground component image since the edge enhancement level of the foreground component image is set lower because unnatural image deterioration is caused by raising the edge enhancement level when the foreground component image after the removal of the motion blur includes noise.

For example, Japanese Laid-Open Patent Publication No. 1-215185 discloses those detecting motion of an object from an input image signal to vary a contour compensation amount (edge enhancement level) for the input image signal depending on the motion detection result as those removing the motion blur due to the time integration effect of an image sensor with a simple configuration. This apparently reduces the motion blurs due to the time integration effect of an image sensor by increasing the edge enhancement level for the input image signal in the area having a larger motion amount of the input image signal and enables the improvement of sharpness of a displayed image and prevention of image quality deterioration (increase in noises in a still area) due to excessive edge enhancement.

Although natural images taken by an image sensor having the time integration effect include motion blurs (camera blurs) described above, animation and CG (computer graphics) images, for example, basically have no motion blur (camera blur) as described above regardless of the motion amount thereof. If the high-frequency component is excessively enhanced in such an image including no motion blur (camera blur), image deterioration may problematically occur in the edge portion.

When a video is taken, the video may be taken by focusing on the entire portion within the imaging screen or focusing on only a portion within the imaging screen in accordance with a photographer's intent, and when focusing on only a portion within the imaging screen, the video is taken as an intentionally blurred video other than the object brought into focus. It is desirable not to perform the excessive enhancement of the high-frequency component for such an area taken to be intentionally blurred.

The present invention was conceived in view of the above situations and it is therefore the object of the present invention to provide an image display device and method capable of implementing a high-definition displayed video by appropriately controlling the processing of reducing motion blurs of a displayed video due to time integration effect of an image sensor.

Means for Solving the Problems

A first invention of the present application is an image display device comprising: a detecting portion that detects a motion amount of an input image signal; and an edge enhancing portion that executes edge enhancement processing to the input image signal, and increasing an edge enhancement level of the edge enhancement processing to an area having a larger motion amount of the input image signal, wherein a control portion is included that reduces the edge enhancement level of the edge enhancement processing or does not execute the edge enhancement processing if it is recognized that a high-frequency component included in the input image signal is not attenuated in the course of generation of the input image signal even in the area having a larger motion amount of the input image signal based on genre information indicative of a content type that the input image signal belongs to.

A second invention of the present application is an image display device comprising: a detecting portion that detects a motion amount of an input image signal; and an edge enhancing portion that executes edge enhancement processing to the input image signal, and increasing an edge enhancement level of the edge enhancement processing to an area having a larger motion amount of the input image signal, wherein a control portion is included that reduces the edge enhancement level of the edge enhancement processing or does not execute the edge enhancement processing if it is recognized that a high-frequency component included in the input image signal is not attenuated in the course of generation of the input image signal even in the area having a larger motion amount of the input image signal based on CG composite information indicative of a screen area position where combined with a computer graphic image is combined with the input image signal.

A third invention of the present application is An image display device comprising: a detecting portion that detects a motion amount of an input image signal; and an edge enhancing portion that executes edge enhancement processing to the input image signal, and increasing an edge enhancement level of the edge enhancement processing to an area having a larger motion amount of the input image signal, wherein a control portion is included that reduces the edge enhancement level of the edge enhancement processing or does not execute the edge enhancement processing if a depth of field is shallow even in the area having a larger motion amount of the input image signal based on camera information indicative of the depth of field at the time of generation of the input image signal using an imaging device.

A fourth invention of the present application is an image display device comprising: a detecting portion that detects a motion amount of an input image signal; and an edge enhancing portion that executes edge enhancement processing to the input image signal, and increasing an edge enhancement level of the edge enhancement processing to an area having a larger motion amount of the input image signal, wherein a control portion is included that reduces the edge enhancement level of the edge enhancement processing or does not execute the edge enhancement processing if it is recognized that a high-frequency component included in the input image signal is not attenuated in the course of generation of the input image signal even in the area having a larger motion amount of the input image signal based on image tone mode information indicative of an image tone mode selected and indicated by a user from among a plurality of image tone modes prearranged for setting and adjusting an image quality of a displayed image.

A fifth invention of the present application is an image display method comprising: a detecting step for detecting a motion amount of an input image signal; and an edge enhancing step for executing edge enhancement processing to the input image signal, and increasing an edge enhancement level of the edge enhancement processing to an area having a larger motion amount of the input image signal, wherein the edge enhancement level of the edge enhancement processing is reduced or the edge enhancement processing is not executed if it is recognized that a high-frequency component included in the input image signal is not attenuated in the course of generation of the input image signal even in the area having a larger motion amount of the input image signal based on genre information indicative of a content type that the input image signal belongs to.

A sixth invention of the present application is n image display method comprising: a detecting step for detecting a motion amount of an input image signal; and an edge enhancing step for executing edge enhancement processing to the input image signal, and increasing an edge enhancement level of the edge enhancement processing to an area having a larger motion amount of the input image signal, wherein the edge enhancement level of the edge enhancement processing is reduced or the edge enhancement processing is not executed if it is recognized that a high-frequency component included in the input image signal is not attenuated in the course of generation of the input image signal even in the area having a larger motion amount of the input image signal based on CG composite information indicative of a screen area position combined with a computer graphic image in the input image signal.

A seventh invention of the present application is An image display method comprising: a detecting step of detecting a motion amount of an input image signal; and an edge enhancing step of executing edge enhancement processing for the input image signal, the image display method of increasing an edge enhancement level of the edge enhancement processing for an area having a larger motion amount of the input image signal, the image display method comprising reducing the edge enhancement level of the edge enhancement processing or not executing the edge enhancement processing if a depth of field is shallow even in the area having a larger motion amount of the input image signal based on camera information indicative of the depth of field at the time of generation of the input image signal using an imaging device.

An eighth invention of the present application is an image display method comprising: a detecting step for detecting a motion amount of an input image signal; and an edge enhancing step for executing edge enhancement processing to the input image signal, and increasing an edge enhancement level of the edge enhancement processing to an area having a larger motion amount of the input image signal, wherein the edge enhancement level of the edge enhancement processing is reduced or the edge enhancement processing is not executed if it is recognized that a high-frequency component included in the input image signal is not attenuated in the course of generation of the input image signal even in the area having a larger motion amount of the input image signal based on image tone mode information indicative of an image tone mode selected and indicated by a user from among a plurality of image tone modes prearranged for setting and adjusting an image quality of a displayed image.

Effect of the Invention

According to the present invention, if it is recognized that a high-frequency component included in an input image signal is not attenuated in the course of generation of the input image signal even in the area having a larger motion amount of the input image signal, the sharpness of displayed images may be improved without making image deterioration noticeable due to the excessive edge enhancement processing by reducing the edge enhancement level of the edge enhancement processing or not executing the edge enhancement processing for the input image signal.

BRIEF DESCRIPTION OF DRAWINGS

FIG. 7 is an explanatory diagram of an operation of the exemplary configuration of the edge enhancing portion.

FIG. 9 is an explanatory diagram of an operation of another exemplary configuration of the edge enhancing portion.

EXPLANATIONS OF LETTERS OR NUMERALS

Figure 1:
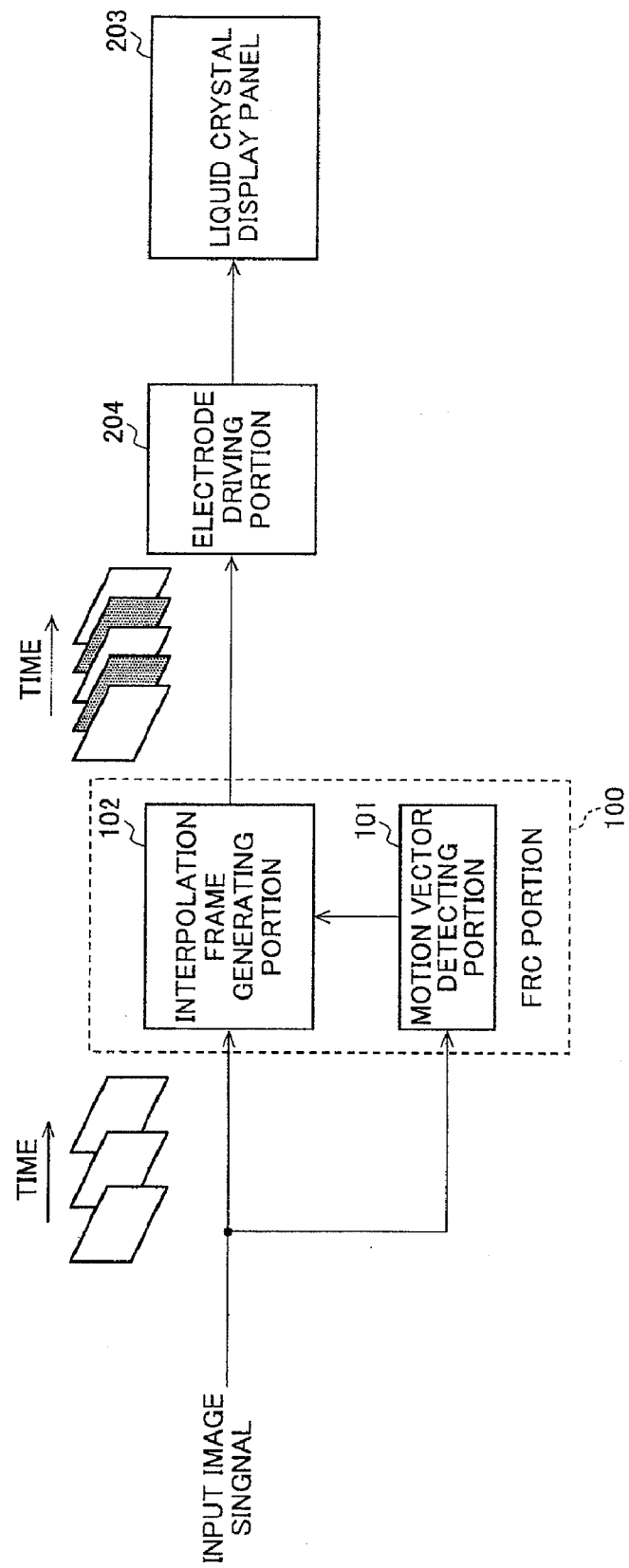
FIG. 1 is a block diagram of a schematic configuration of an FRC drive display circuit in a conventional liquid crystal display device.
Figure 2:
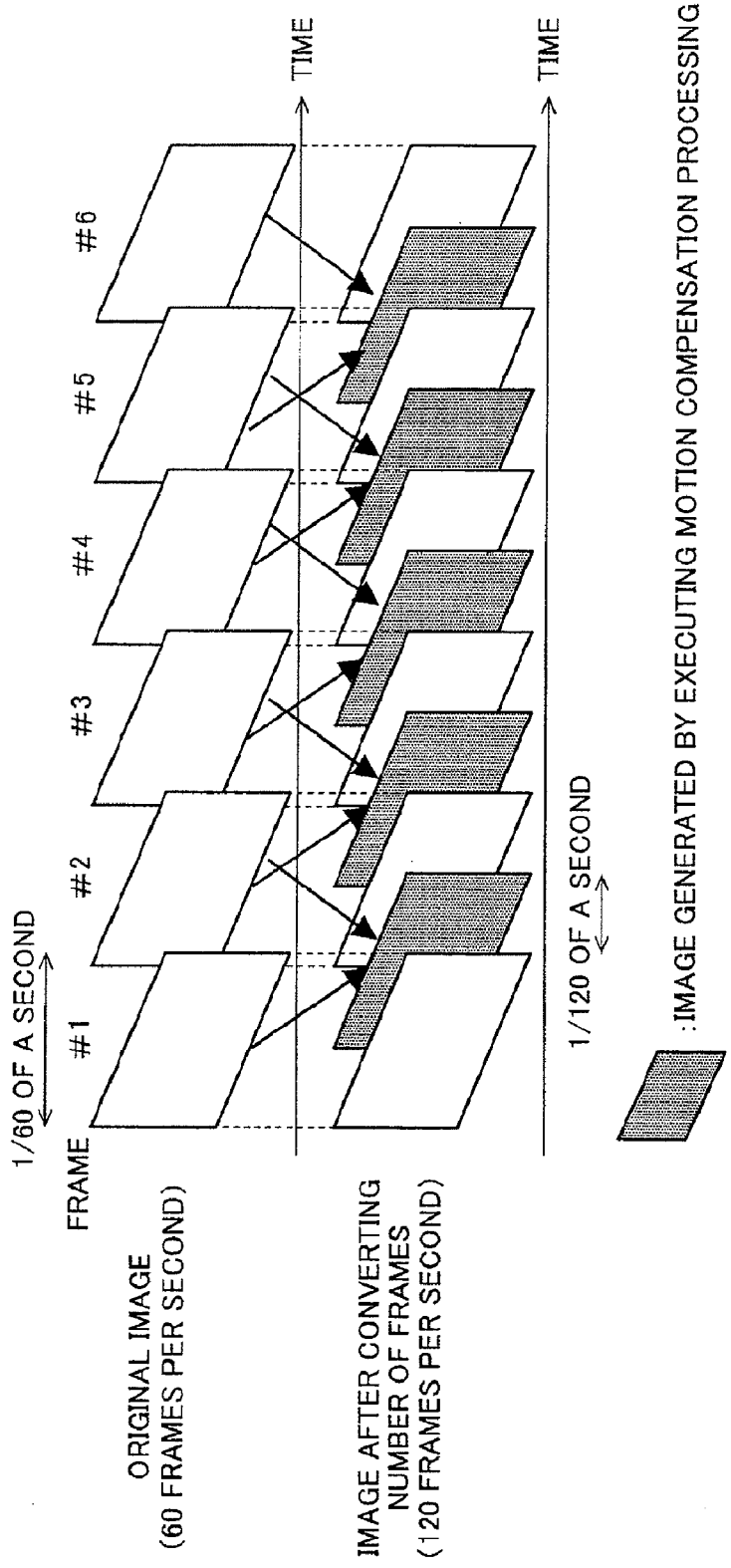
FIG. 2 is a diagram for explaining frame rate conversion processing by the conventional FRC drive display circuit shown in FIG. 1.
Figure 3:
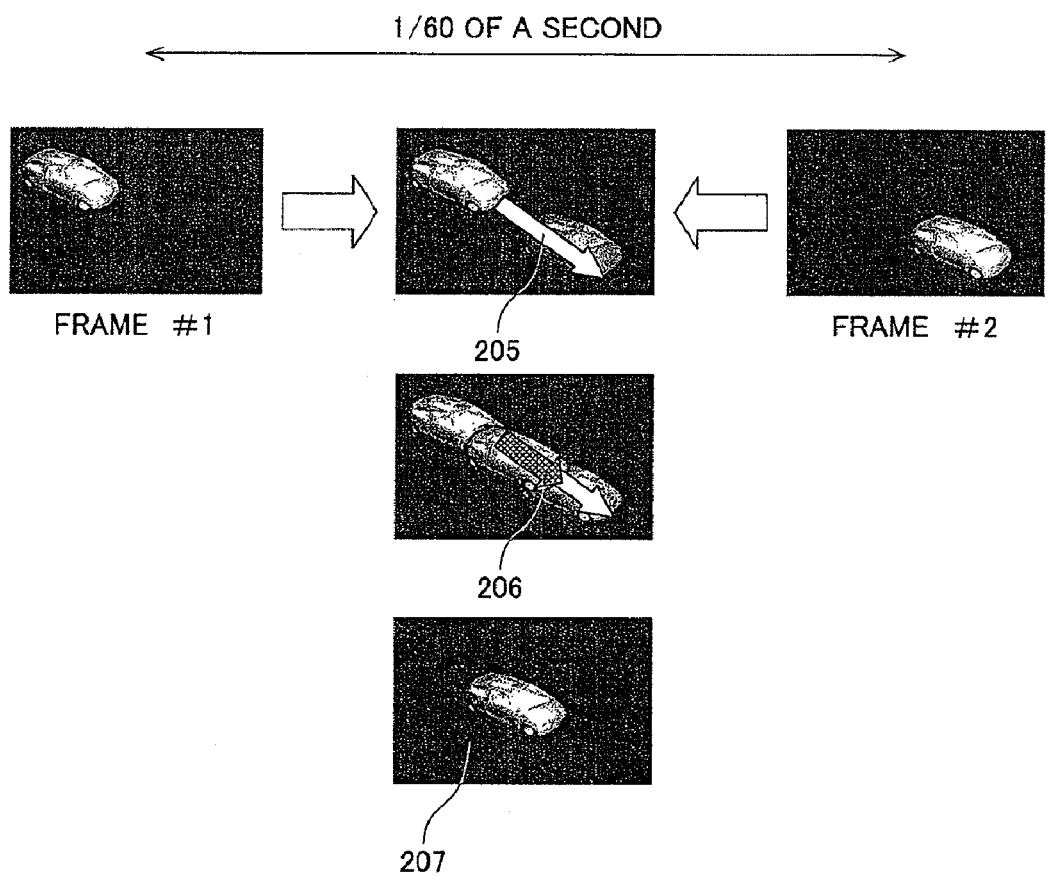
FIG. 3 is a diagram for explaining interpolation frame generation processing of a motion vector detecting portion and of an interpolation frame generating portion.
Figure 4:
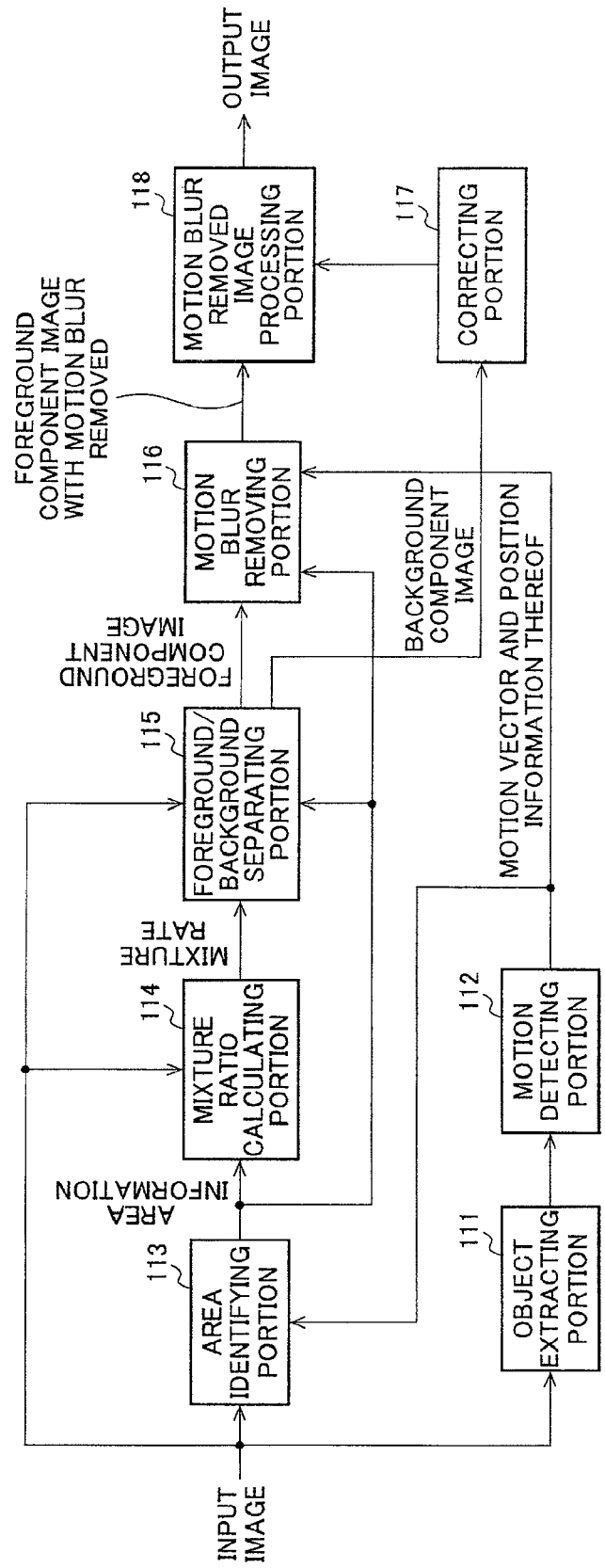
FIG. 4 is a functional block diagram of a configuration of a conventional image processing device.

1 . . . motion detecting portion; 2 . . . edge enhancing portion; 3 . . . genre determining portion; 4 . . . control portion; 5 . . . CG composite position determining portion; 6 . . . shooting condition determining portion; 7 . . . remote-controller light-receiving portion; 21 . . . high-pass filter; 22 . . . gain adjusting portion; 23 . . . adding portion; 24 . . . filter; 100 . . . FRC portion; 101 . . . motion vector detecting portion; 102 . . . interpolation frame generating portion; 103 . . . interpolation vector allocating portion; 104 . . . time base converting portion; 105 . . . frame buffer (FB); 106 . . . original frame vector allocating portion; 107 . . . frame buffer (FB); 111 . . . object extracting portion; 112 . . . motion detecting portion; 113 . . . area identifying portion; 114 . . . mixture ratio calculating portion; 115 . . . foreground/background separating portion; 116 . . . motion blur removing portion; 117 . . . correcting portion; 118 . . . motion blur removed image processing portion; 203 . . . liquid crystal display panel; 204 . . . electrode driving portion; 205 . . . motion vector; 206 . . . interpolation vector; and 207 . . . interpolation frame.

PREFERRED EMBODIMENT OF THE INVENTION

Preferred embodiments of an image display device of the present invention will now be described with reference to the accompanying drawings, and the portions that are the same as those in the above conventional example are given the same reference numerals and will not be described. Although the present invention is applicable to either field signals and interpolation field signals or frame signals and interpolation frame signals, the frame signals and the interpolation frame signals will be described as a representative example since both (field and frame) are in a similar relationship to each other.

Figure 5:
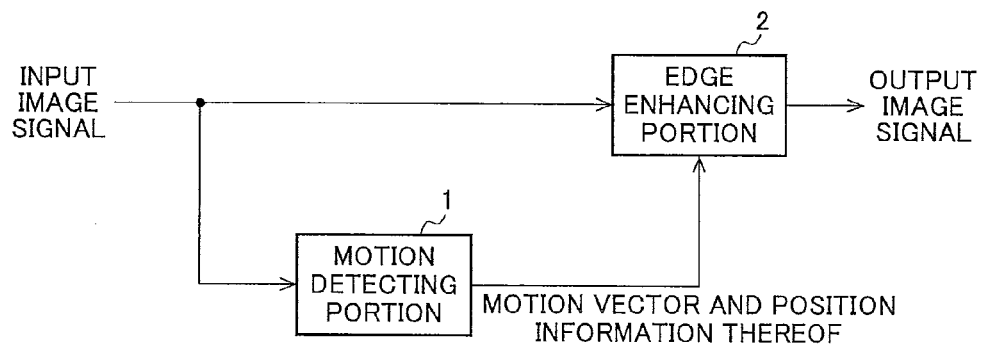
FIG. 5 is a functional block diagram of a schematic configuration of an image display device reducing motion blurs of displayed images due to time integration effect of an image sensor.
Figure 6:
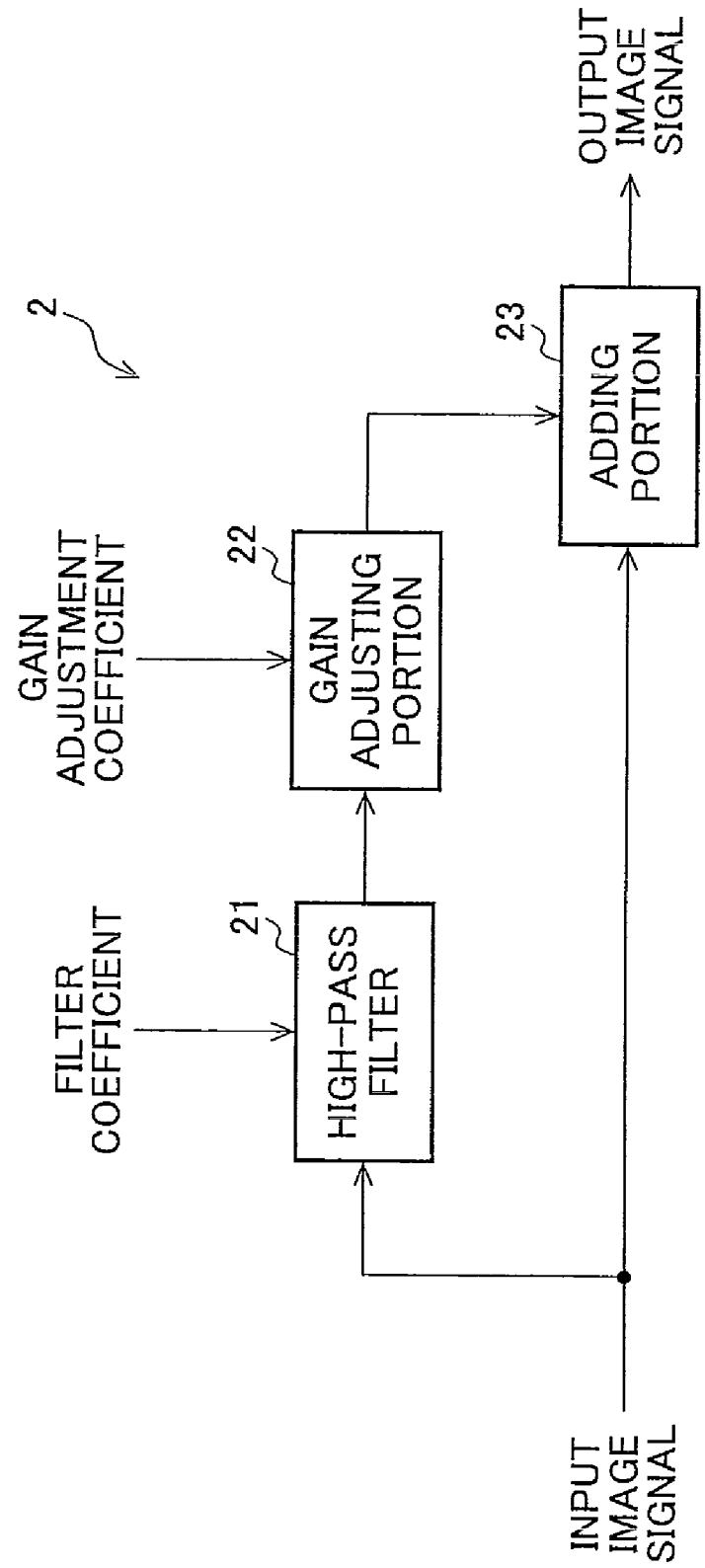
FIG. 6 is a block diagram of an exemplary configuration of an edge enhancing portion.
Figure 8:
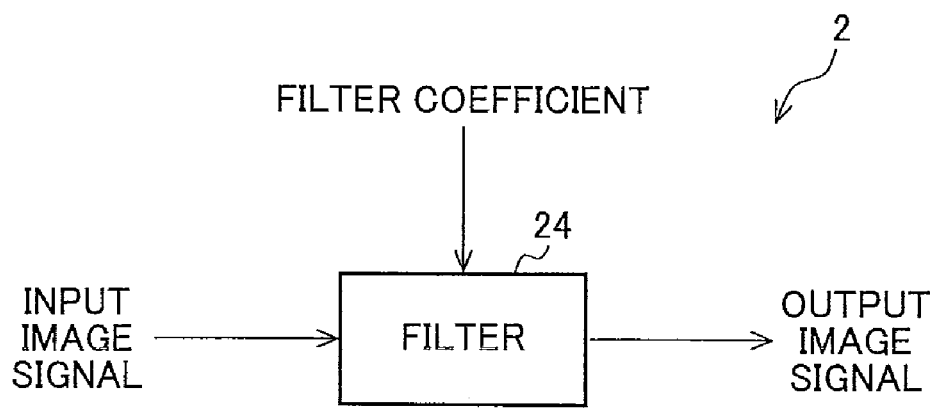
FIG. 8 is a block diagram of another exemplary configuration of the edge enhancing portion.

A configuration of an edge enhancing portion in the image display device of the present invention will first be described with reference to FIGS. 5 to 9. FIG. 5 is a functional block diagram of a schematic configuration of an image display device reducing motion blur of displayed images due to time integration effect of an image sensor; FIG. 6 is a block diagram of an exemplary configuration of the edge enhancing portion; FIG. 7 is an explanatory diagram of an operation of the exemplary configuration of the edge enhancing portion; FIG. 8 is a block diagram of another exemplary configuration of the edge enhancing portion; and FIG. 9 is an explanatory diagram of an operation of another exemplary configuration of the edge enhancing portion.

The image display device reducing motion blur of displayed images due to time integration effect of an image sensor includes a motion detecting portion 1 that detects a motion amount of each of predetermined pixel areas in an input image signal and an edge enhancing portion 2 that enhances a high-frequency component of the input image signal depending on the motion amounts of the input image signal detected by the motion detecting portion 1, as shown in FIG. 5.

The motion detecting portion 1 may obtain a motion vector for each pixel or small block (e.g., a detection block consisting of 8×8 pixels) between two consecutive frames of the input image signal with the use of a block matching method, a gradient method, etc., or if motion vector information is included in the input image signal in some form, this information may be utilized. For example, the image data compression-encoded with the use of the MPEG format includes motion vector information of a moving image calculated at the time of encoding, and this motion vector information may be acquired.

The edge enhancing portion 2 varies a level and a frequency range of enhancement of the high-frequency component of the input image signal based on the motion vector detected by the motion detecting portion 1 and the position information thereof to execute an edge enhancement processing for the input image signal. The edge enhancing portion 2 may switch a level and a frequency range of enhancement of the high-frequency component of the input image signal within a screen depending on the distribution of the motion amounts of the image within the screen of the input image signal. The image signal motion-adaptively subjected to a sharpening processing by the edge enhancing portion 2 is displayed and output by a display device (not shown) such as a cathode-ray tube or a liquid crystal display panel separately or integrally configured.

Since the high-frequency component is more likely to be attenuated due to the time integration effect of an image sensor in an area having a larger motion amount of the input image signal, the edge enhancing portion 2 executes an appropriate edge enhancing processing to compensate the attenuated high-frequency component. This reduces apparent motion blurs and can improve the sharpness of displayed images.

FIG. 6 depicts an exemplary configuration of the edge enhancing portion 2. An input image signal is input to a high-pass filter 21 and an adder 23. The high-pass filter 21 extracts an image component having higher frequencies, i.e., removes an image component having lower frequencies, from the input image signal based on an input filter coefficient to generate an edge image signal. The input filter coefficient is varied stepwise depending on the motion amounts detected by the motion detecting portion 1. When the filter coefficient is varied, the high-pass filter 21 changes a frequency of the image to be extracted, a frequency of the image to be removed, and a gain of the image to be extracted.

The edge image signal generated by the high-pass filter 21 is supplied to a gain adjusting portion 22. The gain adjusting portion 22 amplifies or attenuates the edge image signal supplied from the high-pass filter 21 based on an input gain adjustment coefficient. The input gain adjustment coefficient is varied stepwise depending on the motion amounts detected by the motion detecting portion 1. When the gain adjustment coefficient is varied, the gain adjusting portion 22 changes an amplification rate (attenuation rate) of the edge image signal.

For example, the gain adjusting portion 22 amplifies the edge image signal when the gain adjustment coefficient specifying an amplification rate of one or greater is input and attenuates the edge image signal when the gain adjustment coefficient specifying an amplification rate less than one is input. The edge image signal with the gain adjusted by the gain adjusting portion 22 is supplied to the adding portion 23. The adding portion 23 adds the input image signal and the gain adjusted edge image signal supplied from the gain adjusting portion 22 to output an added image signal.

The edge enhancing portion 2 configured as above does not execute the edge enhancement processing (disables the edge enhancement processing to directly output the input image signal) in an area where the motion amount of the input image signal is zero, for example. For an area having a smaller motion amount of the input image signal, the edge enhancing portion 2 limits a frequency of the image extracted by the high-pass filter 21 to higher frequencies and constrains the amplification rate of the edge image signal of the gain adjusting portion 22 to one, as shown in FIG. 7(*a*). For an area having a larger motion amount of the input image signal, the edge enhancing portion 2 expands the frequency range of the image extracted by the high-pass filter 21 toward the lower side and makes the amplification rate of the edge image signal of the gain adjusting portion 22 greater than one, as shown in FIG. 7(*b*).

Since the high-frequency component is likely to be attenuated due to the time integration effect of an image sensor in the area having a larger motion amount of the input image signal, the apparent motion blurs may be reduced to improve the sharpness of the displayed image by increasing the edge enhancement level to compensate the attenuated high-frequency component. Since the high-frequency component tends to be attenuated in a wider range in the area having a larger motion amount of the input image signal, the apparent motion blurs may be reduced to improve the sharpness of the displayed image by expanding the enhanced frequency range of the input image signal.

Although the example of the edge enhancing portion 2 has the high-pass filter 21 and the gain adjusting portion 22, at least one of the high-pass filter 21 and the gain adjusting portion 22 may be included. The edge enhancing processing may not be executed in the area where the motion amount of the input image signal is zero since no motion blur (camera blur) occurs.

FIG. 8 depicts another exemplary configuration of the edge enhancing portion 2. In the example shown in FIG. 8, the edge enhancing portion 2 is made up of a filter 24. The filter 24 amplifies a component having higher frequencies of the input image signal based on an input filter coefficient to generate an edge-enhanced image signal. The input filter coefficient is varied stepwise depending on the motion amounts detected by the motion detecting portion 1. When the filter coefficient is varied, the filter 24 changes the gain of the high-frequency component of the input image signal.

For example, the input image signal is allowed to pass without change (the edge enhancing processing is disabled) in the area where the motion amount of the input image signal is zero. For the area having a smaller motion amount of the input image signal, the component having higher frequencies of the input image signal is amplified and doubled and the component having lower frequencies of the input image signal is allowed to pass without change to generate the edge enhanced image signal, as shown in FIG. 9(*a*). For the area having a larger motion amount of the input image signal, the component having higher frequencies of the input image signal is amplified by a factor of 2.5 and the component having lower frequencies of the input image signal is allowed to pass without change to generate the edge enhanced image signal, as shown in FIG. 9(*b*).

Since the high-frequency component is likely to be attenuated due to the time integration effect of an image sensor in the area having a larger motion amount of the input image signal, the apparent motion blurs may be reduced to improve the sharpness of the displayed image by increasing the edge enhancement level to compensate the attenuated high-frequency component. On the other hand, since the high-frequency component is less likely to be attenuated due to the time integration effect of an image sensor in the area having a smaller motion amount of the input image signal, the image quality deterioration at edge portions due to the excessive edge enhancement may be prevented by lowering the level of the edge enhancement. Since no motion blur (camera blur) occurs in the area where the motion amount of the input image signal is zero, the edge enhancement processing may not be executed. It is needless to say that the configuration of the edge enhancing portion 2 of the present invention is not limited to the above configuration.

Although a method of varying the edge enhancement level depending on the motion amounts of the input image signal is described with the above example of the image display device, a filter characteristic, for example, a tap shape of the filter may be varied depending on the motion direction of the input image signal in addition to the motion amounts of the input image signal. For example, since the high-frequency component is not attenuated due to the time integration effect of an image sensor in a vertical direction in the image signal only having horizontal motions, it is desirable to execute the filtering processing in a horizontal direction and, therefore, if the motion vector detected from the input image signal only has a horizontal component, the tap shape of the high-pass filter 21 of FIG. 6 or the filter 24 of FIG. 8 is switched to a one-dimensional horizontal tap.

Similarly, if the motion vector detected from the input image signal only has a vertical component (if the video moves in a vertical direction), the filter may be switched to a one-dimensional vertical tap shape filter, or if the motion vector detected from the input image signal has a horizontal component and a vertical component (if the video moves in an oblique direction), the filter may be switched to a filter in a oblique-direction tap shape filter. By performing switch-over to the filter having a tap shape such as isotropic or anisotropic shape or an elliptical shape, a more ideal filtering processing becomes possible.

If a motion vector is detected on the basis of a motion detection block consisting of, for example, 8×8 pixels of the input image signal and the edge enhancement processing is controlled based on this motion vector, a different edge enhancement processing is executed for each of the 8×8-pixel block areas and, therefore, artifacts (image deteriorations) may occur at block boundaries. A method for removing such a harmful effect may include, for example, providing a low-pass filter for the motion vector between the motion detecting portion 1 and the edge enhancing portion 2 to smooth the motion vector. Smoothing a change in the motion vector within the screen may prevent the artifacts at the block boundaries generated by an abrupt change in the edge enhancement processing.

Although natural images taken by an image sensor having the time integration effect include motion blurs (camera blurs) described above, animation and CG (computer graphics) images basically have no motion blur (camera blur) as described above. If the high-frequency component is excessively enhanced in such an image including no motion blur (camera blur), image deterioration may occur in the edge portion. Therefore, if an image signal related to animation or CG is input, it is desirable to reduce the intensity of the above motion blur reduction (sharpening) processing even in the area having a larger motion amount of the input image signal.

For example, a genre type related to the input image signal may be determined based on genre information included in EPG (Electronic Program Guide) data separated and extracted from television broadcast data and, for example, if it is determined that the genre type of the input image signal is animation, the edge enhancing portion 2 may reduce the level of enhancement of the high-frequency component or narrow the enhanced frequency range or the control may be performed to disable the edge enhancement processing by the edge enhancing portion 2 even in the area having a larger motion amount of the input image signal in the same way as the area having a smaller motion amount.

Similarly, when a CG image or an artificial image such as a program logo, characters like a telop, and an icon is combined (overlapped) with a portion of a natural image, it is desirable to reduce the intensity of the above motion blur reduction (sharpening) processing or not to execute the processing for the area combined with the CG image or artificial image even if the background natural image has a larger motion amount or if the movement speed of the CG image is high.

For example, if information indicative of a screen area position combined (overlapped) with a CG image such as a program logo, characters like a telop, and an icon is multiplexed and transmitted with television broadcast data, this information may be used for the edge enhancing portion 2 to reduce the level of enhancement of the high-frequency component or to narrow the enhanced frequency range or to perform the control to disable the edge enhancement processing by the edge enhancing portion 2 for the area combined (overlapped) with the CG image in the same way as for the area having a smaller motion amount or no motion of an image.

Since the motion blurs due to the time integration effect of an image sensor vary depending on an exposure time, i.e., a shutter speed of an image sensor at the time of taking a video, it is desirable to weaken the intensity of the above motion blur reduction (sharpening) processing if the shutter speed at the time of taking an image of the input image signal is high, i.e., the exposure time is short, even when a motion amount of the input image signal is large, for example.

Therefore, for example, if information related to a shutter speed at the time of taking a video is added to the television broadcast data, the information related to a shutter speed may be separated and acquired from the television broadcast data to variably control the level of enhancement of the high-frequency component by the edge enhancing portion 2 and/or the enhanced frequency range or not to execute the edge enhancement processing depending on the information related to a shutter speed.

When a video is taken, the video may be taken by focusing on the entire portion within the imaging screen or focusing on only a portion within the imaging screen in accordance with a photographer's intent. When focusing on only a portion within the imaging screen, the video is taken as an intentionally blurred video other than the object brought into focus. It is desirable to reduce the intensity of the above motion blur reduction (sharpening) processing or not to execute the motion blur reduction (sharpening) processing for such an area taken to be intentionally blurred.

When a video is taken with a focus on only a portion within the imaging screen, this is generally implemented by reducing the depth of field of a camera. The depth of field is determined by various factors such as an F-number of a camera lens, a distance between a camera and an object, and setting conditions (diaphragm, gain, and speed) of a camera. For example, the factors reducing the depth of field include reducing the F-number of a camera lens, shrinking the distance to the object, or opening the diaphragm.

Therefore, if information related to such a depth of field is added to the television broadcast data, for example, as metadata, the information related to a depth of field is acquired from the television broadcast data and a state of the depth of field may be determined to variably control the level of enhancement of the high-frequency component by the edge enhancing portion 2 and/or the enhanced frequency range or not to execute the edge enhancement processing depending on the determination result.

In the motion vector detection block, for example, a frequency analysis such as DCT may be performed to check an amount of the high-frequency component to detect a portion overlapped with a CG image or a portion having less motion blur regardless of fast motion in an image taken by a camera with a fast shutter speed as above. If a certain motion detection block has a large motion amount and a small high-frequency component, this is considered as a portion where motion is fast and a high-frequency component is lost by motion blurs.

In other words, this is considered as a portion with many motion blurs in an image taken by a camera with a slow shutter speed rather than a portion overlapped with a CG image and a portion having less motion blur in an image taken by a camera with a fast shutter speed. Therefore, the edge enhancement processing may be executed as usual.

On the other hand, if a certain motion detection block has a large motion amount and a large high-frequency component, since this is considered to indicate the movement of a portion overlapped with a CG image or a portion having less motion blur in an image taken by a camera with a fast shutter speed, the edge enhancement level may be reduced. By analyzing the image signal and determining a motion amount and an amount of the high-frequency portion in a compounded manner as above, an appropriate intensity of the motion blur reduction processing may be determined.

First Embodiment

Figure 10:
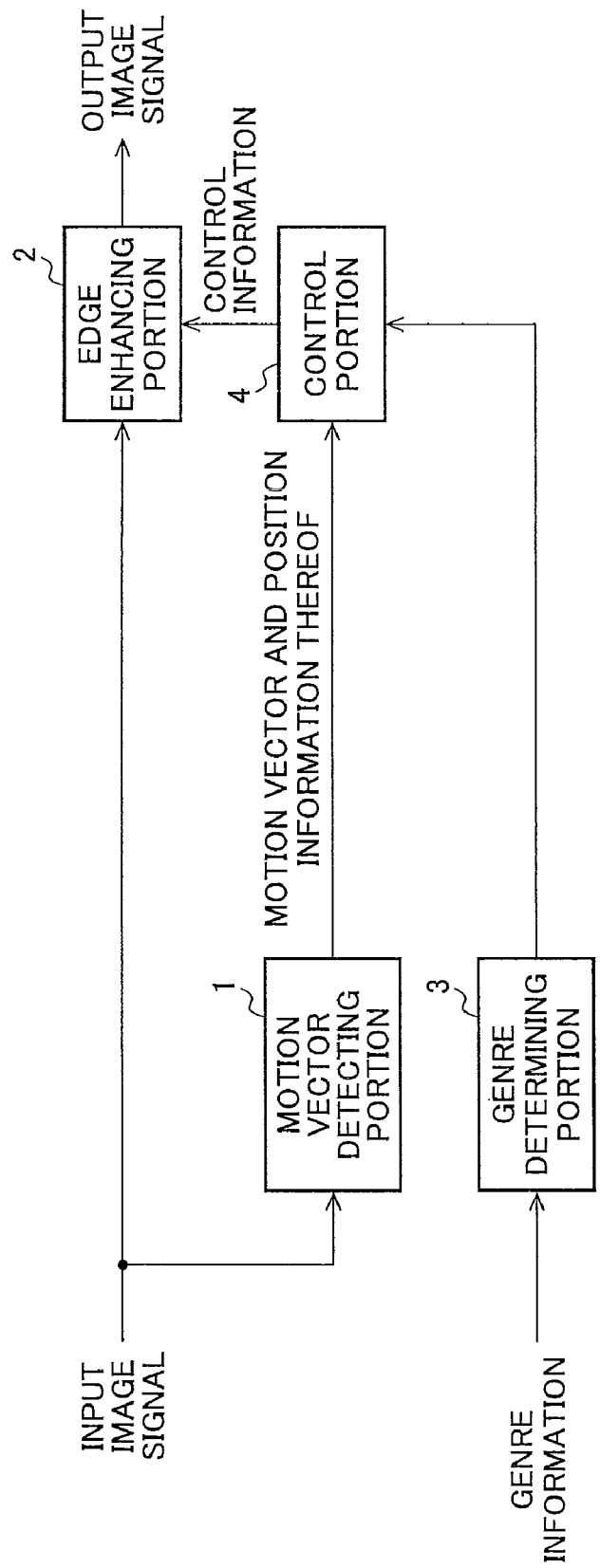
FIG. 10 is a functional block diagram of a schematic configuration of an image display device according to a first embodiment of the present invention.

An image display device according to a first embodiment of the present invention will be described with reference to FIG. 10, and the portions same as the above image display device are given the same reference numerals and will not be described. FIG. 10 is a functional block diagram of a schematic configuration of the image display device of this embodiment.

As shown in FIG. 10, the image display device of the embodiment includes a genre determining portion 3 that determines a content genre type that an input image signal belongs to from genre information acquired from the outside of the image display device and a control portion 4 that reduces the edge enhancement level of the edge enhancement processing or does not execute the edge enhancement processing for the input image signal if it is determined that the genre type of the input image signal is a predetermined genre (e.g., animation) even in the area having a larger motion amount of the input image signal detected by the motion detecting portion 1.

The genre determining portion 3 determines a content genre type that an input image signal belongs to based on genre information included in the EPG (Electronic Program Guide) data separated and extracted from television broadcast data, for example. Although the genre information may be utilized as information included in a portion of the EPG data overlapped and transmitted with, for example, the broadcast data of the terrestrial digital broadcasting or BS/CS digital broadcasting, this kind of information indicative of genre is not limited to information separated/acquired from broadcast data and, for example, if video information reproduced by an external device (such as a DVD player and a Blu-ray Disc player) is displayed, a flag representative of a content type (e.g., an identification code indicative of "animation") added to a medium storing the video information may be read and detected by the genre determining portion 3.

The television broadcast data is not limited to that of the digital broadcasting and the genre information may also be acquired from analog broadcasting. For example, ADAMS-EPG is the EPG information transmitted by superimposed the analog broadcast signals.

The genre information of video contents may be input and acquired not only concurrently with the video information but also from a route other than the video information. For example, XMLTV is an application that automatically acquires a TV program table published on the Web to output the program table in the XML format, and this may be utilized for acquiring the genre information of a video to be displayed from an external device on a network.

For example, the genre code is prescribed as the genre information by the terrestrial digital broadcasting standard for program genres of "news/report", "sport", "information/tabloid show", "drama", "music", "variety show", "movie", "animation/special effects", "documentary/cultural", "stage/performance", "hobby/educational", and "others" as major categories, and a plurality of middle categories are prescribed for each of the major categories.

The image display device of the embodiment determines which genre the input image signal belongs to and controls the edge enhancement processing of the edge enhancing portion 2 depending on this determination result. For example, if a genre type of an input image signal is "domestic/foreign animation" (middle category) within "animation/special effects" (major category) produced with the CG (computer graphics technology) or "animation" (middle category) within "movie" (major category), the input signal basically includes no motion blur (camera blur) due to the time integration effect of an image sensor and it is recognized that a high-frequency component included in the input image signal is not attenuated in the course of generation of the input image signal even in the area having a larger motion amount.

Therefore, for example, if a genre type of an input image signal is "domestic/foreign animation" (middle category) within "animation/special effects" (major category) or "animation" (middle category) within "movie" (major category), the image deterioration due to the excessive edge enhancement processing may be prevented by performing control to reduce the edge enhancement level of the edge enhancement processing of the edge enhancing portion 2 or not to execute (disable) the edge enhancement processing even in the area having a larger motion amount of the input image signal detected by the motion detecting portion 1.

As described above, according to the embodiment, the edge enhancement level may appropriately be controlled depending on the genre type of the input image signal to increase the edge enhancement level in the area having a larger motion amount in the case of the image signal including the motion blurs (camera blurs) due to the time integration effect of an image sensor and to reduce the edge enhancement level even in the area having a larger motion amount in the case of the image signal including no motion blur (camera blur) due to the time integration effect of an image sensor, and the image deterioration due to the excessive edge enhancement processing may be prevented from being noticeable and the sharpness of the displayed image is improved at the same time.

Second Embodiment

Figure 11:
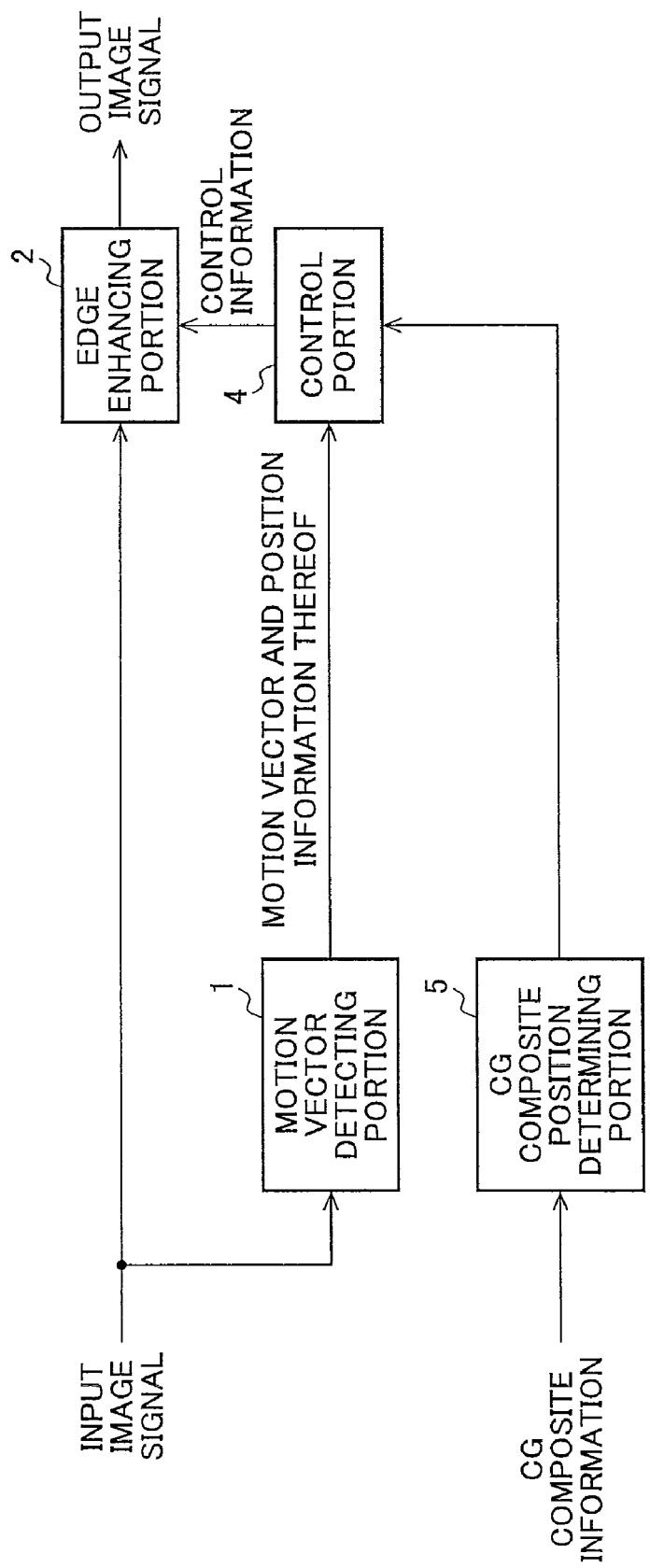
FIG. 11 is a functional block diagram of a schematic configuration of an image display device according to a second embodiment of the present invention.

An image display device according to a second embodiment of the present invention will be described with reference to FIG. 11, and the portions the same as the above image display device are given the same reference numerals and will not be described. FIG. 11 is a functional block diagram of a schematic configuration of the image display device of this embodiment.

As shown in FIG. 11, the image display device of the embodiment includes a CG composite position determining portion 5 that determines a screen area position combined (overlapped) with a CG image or an artificial image in the input image signal from CG composite information acquired from the outside of the image display device and the control portion 4 reducing the edge enhancement level of the edge enhancement processing or not executing the edge enhancement processing for the input image signal if a screen area is determined as being combined with a CG image even in the area having a larger motion amount of the input image signal detected by the motion detecting portion 1.

The CG composite information indicates a screen area position where a CG image such as a program logo, characters like a telop, and an icon is combined (overlapped) with the input image signal and if the CG composite information is multiplexed and transmitted with television broadcast data, the CG composite position determining portion 5 is capable of determining the screen area position where a CG image is combined with the input image signal based on the CG composite information separated and extracted from the television broadcast data.

Such CG composite information is not limited to information separated/acquired from broadcast data and, for example, if video information reproduced by an external device (such as a DVD player and a Blu-ray Disc player) is displayed, the CG composite information added to a medium storing the video information may be read and detected by the CG composite position determining portion 5.

The CG composite information may be input and acquired not only concurrently with the video information but also from a route other than the video information. For example, if the CG composite information is stored and correlated with a reproduction time of the video information for each of video contents in an external device on a network, the CG composite information of a video to be displayed may be acquired from the external device via the network.

The image display device of the embodiment determines a screen area position where a CG image or an artificial image combined (overlapped) with the input image signal to control the edge enhancement processing of the edge enhancing portion 2 depending on this determination result. The image signal in the screen area where a CG image or an artificial image is combined with the image signal basically includes no motion blur (camera blur) due to the time integration effect of an image sensor and it is recognized that a high-frequency component included in the input image signal is not attenuated in the course of generation of the input image signal even in the area having a larger motion amount.

Therefore, for the screen area where a CG image or an artificial image is combined with a image, the image deterioration due to the excessive edge enhancement processing may be prevented by performing control to reduce the edge enhancement level of the edge enhancement processing of the edge enhancing portion 2 or not to execute (disable) the edge enhancement processing even in the area having a larger motion amount of the input image signal detected by the motion detecting portion 1.

As described above, according to the embodiment, the edge enhancement level may appropriately be controlled depending on the image type of each screen area of the input image signal (whether a natural image or CG image (or an artificial image)) to increase the edge enhancement level in the area having a larger motion amount in the case of the area of the image signal including the motion blurs (camera blurs) due to the time integration effect of an image sensor and to reduce the edge enhancement level even in the area having a larger motion amount in the case of the area of the image signal including no motion blur (camera blur) due to the time integration effect of an image sensor, and the image deterioration due to the excessive edge enhancement processing may be prevented from being noticeable and the sharpness of the displayed image is improved at the same time.

Third Embodiment

Figure 12:
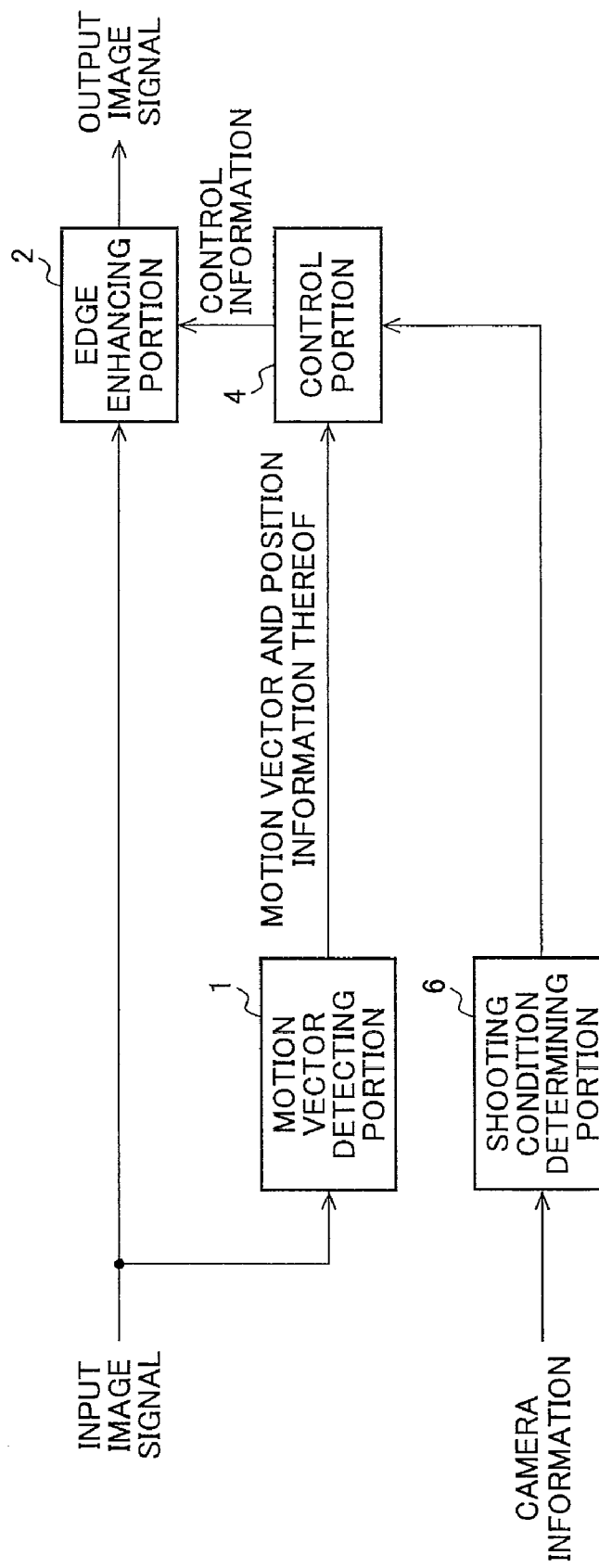
FIG. 12 is a functional block diagram of a schematic configuration of an image display device according to a third embodiment of the present invention.

An image display device according to a third embodiment of the present invention will be described with reference to FIG. 12, and the portions that are the same as those in the above image display device are given the same reference numerals and will not be described. FIG. 12 is a functional block diagram of a schematic configuration of the image display device of this embodiment.

As shown in FIG. 12, the image display device of the embodiment includes a shooting condition determining portion 6 that determines a shooting condition (such as a shutter speed and a depth of field) at the time of generation of an input image signal using an imaging device from camera information acquired from the outside of the image display device and the control portion 4 that reduces the edge enhancement level of the edge enhancement processing or does not execute the edge enhancement processing for the input image signal if it is determined that a shooting condition of generating the input image signal falls under a predetermined shooting condition (such as a high shutter speed at the time of shooting and a shallow depth of field at the time of shooting) even in the area having a larger motion amount of the input image signal detected by the motion detecting portion 1.

The camera information indicates a shooting condition (such as a shutter speed, an exposure time, a depth of field, an F-number of a camera lens, a distance to an object, and a diaphragm) at the time of generation of the input image signal using an imaging device and is the camera information is multiplexed and transmitted with television broadcast data, the shooting condition determining portion 6 is capable of determining the shooting condition at the time of generation of the input image signal based on the camera information separated and extracted from the television broadcast data.

Such camera information is not limited to information separated/acquired from broadcast data and, for example, if video information reproduced by an external device (such as a DVD player and a Blu-ray Disc player) is displayed, the camera information added to a medium storing the video information may be read and detected by the shooting condition determining portion 6. For example, if the video information and the camera information are correlated and stored in a recording medium at the time of shooting video, the camera information may be acquired.

The camera information may be input and acquired not only concurrently with the video information but also from a route other than the video information. For example, if the camera information is stored and correlated with a reproduction time of the video information for each of video contents in an external device on a network, the camera information of a video to be displayed may be acquired from the external device via the network.

The image display device of the embodiment determines a shooting condition at the time of generation of the input image signal to control the edge enhancement processing of the edge enhancing portion 2 depending on this determination result. If the shutter speed at the time of shooting video is high, i.e., the exposure time is short, no motion blur (camera blur) due to the time integration effect of an image sensor is included and it is recognized that a high-frequency component included in the input image signal is not attenuated in the course of generation of the input image signal even in the area having a larger motion amount.

Therefore, if the shutter speed is high at the time of generation of the input image signal using an imaging device, the image deterioration due to the excessive edge enhancement processing may be prevented by performing control to reduce the edge enhancement level of the edge enhancement processing of the edge enhancing portion 2 or not to execute (disable) the edge enhancement processing even in the area having a larger motion amount of the input image signal detected by the motion detecting portion 1.

Therefore, if the depth of field at the time of shooting video is shallow, i.e., in such a case that the F-number of a camera lens is small, or a distance to the object is short, or the diaphragm is opened, the video is originally taken as an blurred video other than the object brought into focus in accordance with a photographer's intent and it is recognized that a high-frequency component included in the input image signal is not attenuated due to the time integration effect of the imaging device.

Therefore, if the depth of field is shallow at the time of generation of the input image signal using an imaging device, the image deterioration due to the excessive edge enhancement processing may be prevented by performing control to reduce the edge enhancement level of the edge enhancement processing of the edge enhancing portion 2 or not to execute (disable) the edge enhancement processing even in the area having a larger motion amount of the input image signal detected by the motion detecting portion 1.

As described above, according to the embodiment, the edge enhancement level may appropriately be controlled depending on the shooting condition (such as a shutter speed and a depth of field) at the time of generation of an input image signal using an imaging device to increase the edge enhancement level in the area having a larger motion amount in the case of the area of the image signal including the motion blurs (camera blurs) due to the time integration effect of the image sensor and to reduce the edge enhancement level even in the area having a larger motion amount in the case of the area of the image signal including no motion blur (camera blur) due to the time integration effect of an image sensor, and the image deterioration due to the excessive edge enhancement processing may be prevented from being noticeable and the sharpness of the displayed image is improved at the same time.

Fourth Embodiment

Figure 13:
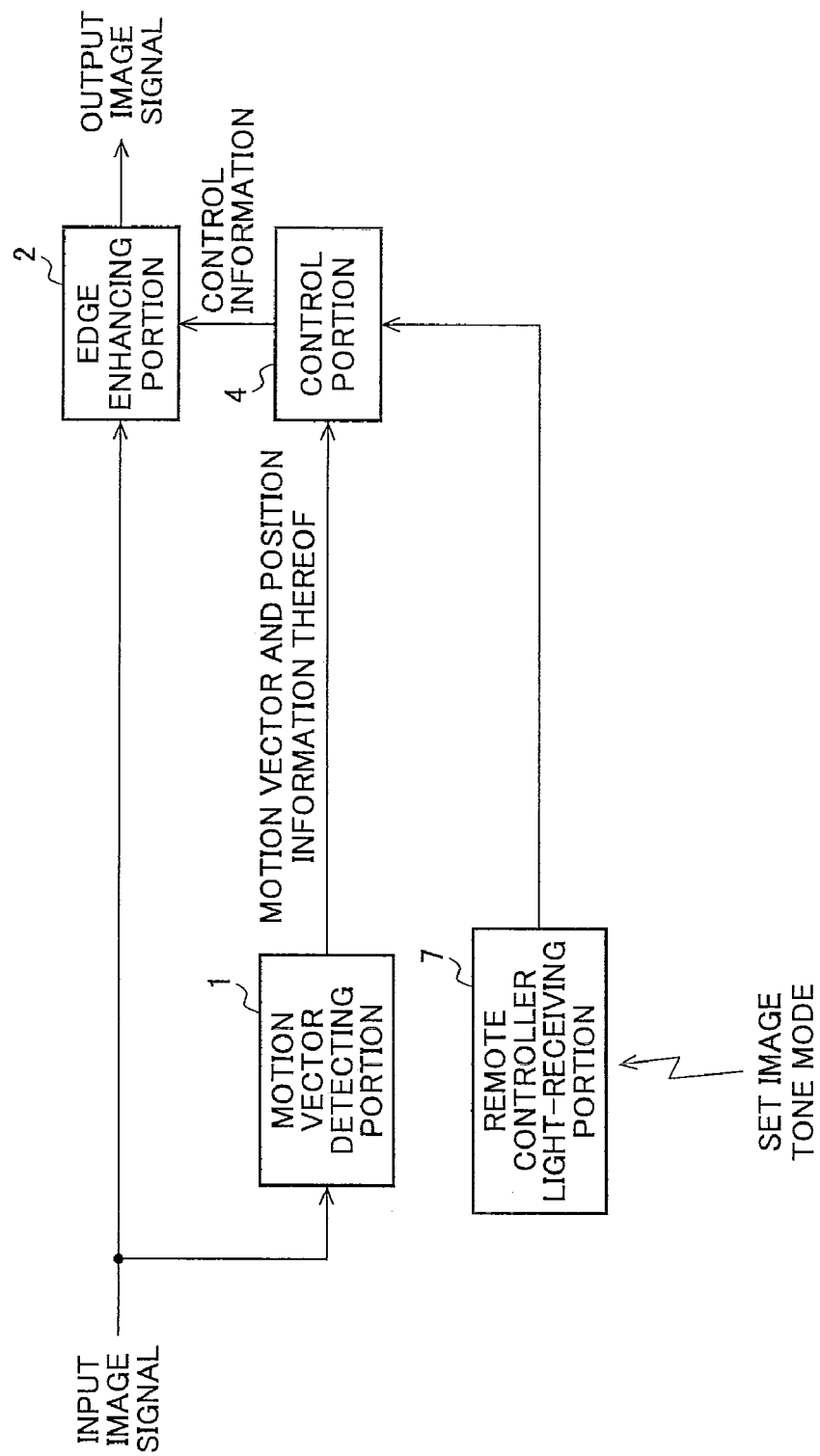
FIG. 13 is a functional block diagram of a schematic configuration of an image display device according to a fourth embodiment of the present invention.

An image display device according to a fourth embodiment of the present invention will be described with reference to FIG. 13, and the portions that are the same as those in the above image display device are given the same reference numerals and will not be described. FIG. 13 is a functional block diagram of a schematic configuration of the image display device of this embodiment.

As shown in FIG. 13, the image display device of the embodiment includes a remote-controller light-receiving portion 7 that receives image tone mode setting information indicative of an image tone selected and indicated by a user out of a plurality of image tones prearranged for setting and adjusting the image quality of the displayed image from the outside of the device and the control portion 4 that reduces the edge enhancement level of the edge enhancement processing or does not execute the edge enhancement processing for the input image signal if it is determined that the image tone mode selected and indicated by the user is a predefined image tone mode (such as a game mode) determined in advance even in the area having a larger motion amount of the input image signal detected by the motion detecting portion 1.

The remote-controller light-receiving portion 7 receives a remote control signal transferred from a remote controller (remote control device) not shown and outputs the signal to the control portion 4. The control portion 4 analyzes the remote control signal received by the remote-controller light-receiving portion 7 and controls the image quality adjustment processing in accordance with the user's instructions for operation. A typical television receiver has the image tone modes prearranged as, for example, a "standard mode", a "dynamic mode", a "movie mode", and a "game mode" and a user may operate a remote controller (not shown) to select and indicate one of the image tone modes.

If user's image mode selection is indicated when analyzing the remote control signal received by the remote-controller light-receiving portion 7, the control portion 4 outputs adjustment values such as screen brightness, contrast, black level, color density, hue, and edge enhancement (sharpness) stored in a correlation with the image tone mode to an image quality adjusting portion (not shown). The image quality adjusting portion (not shown) executes predetermined image quality adjustment for the input image signal.

For example, when watching a movie program or movie software, a user operates the remote controller (not shown) to select the "movie mode" to execute the image quality adjustment suitable for watching movies. Similarly, when viewing a video game, the "game mode" may be selected to execute the image quality adjustment suitable for viewing video games. When a user selects the "movie mode", a movie video is most likely to be input and when the "game mode" is selected, a game (CG) video is most likely to be input.

Although the image tone modes may be switched in the order of "standard mode"→"dynamic mode"→"movie mode"→"game mode"→"standard mode"→ . . . every time an image tone mode selection button provided on the remote controller (not shown) is pressed in the embodiment, this is not a limitation of a method of the image tone mode selecting operation. The edge enhancing portion 2 may be provided inside an image adjusting portion (not shown) or outside the image adjusting portion (not shown).

The image display device of the embodiment controls the edge enhancement processing of the edge enhancing portion 2 depending on the image tone mode selected and indicated by a user. If the image tone mode set by a user is, for example, the "game mode", which is prepared as a mode suitable for viewing game videos produced through the CG (computer graphics) technology, the input image signal basically includes no motion blur (camera blur) due to the time integration effect of an image sensor and it is recognized that the high-frequency component included in the input image signal is not attenuated in the course of generation of the input image signal even in the area having a larger motion amount.

Therefore, if the image tone mode set by a user is the "game mode", the image deterioration due to the excessive edge enhancement processing may be prevented by performing control to reduce the edge enhancement level of the edge enhancement processing of the edge enhancing portion 2 or not to execute (disable) the edge enhancement processing even in the area having a larger motion amount of the input image signal detected by the motion detecting portion 1.

As described above, according to the embodiment, the edge enhancement level may appropriately be controlled depending on the image tone mode set by a user to increase the edge enhancement level in the area having a larger motion amount in the case of the image signal including the motion blurs (camera blurs) due to the time integration effect of an image sensor and to reduce the edge enhancement level even in the area having a larger motion amount in the case of the image signal including no motion blur (camera blur) due to the time integration effect of an image sensor, and the image deterioration due to the excessive edge enhancement processing may be prevented from being noticeable and the sharpness of the displayed image is improved at the same time.

An image display device will hereinafter be described that is capable of implementing a high-definition displayed video by reducing the motion blurs due to the holding-type display system in addition to the motion blurs (camera blurs) due to the time integration effect of an image sensor, as fifth and sixth embodiments of the present invention.

Fifth Embodiment

Figure 14:
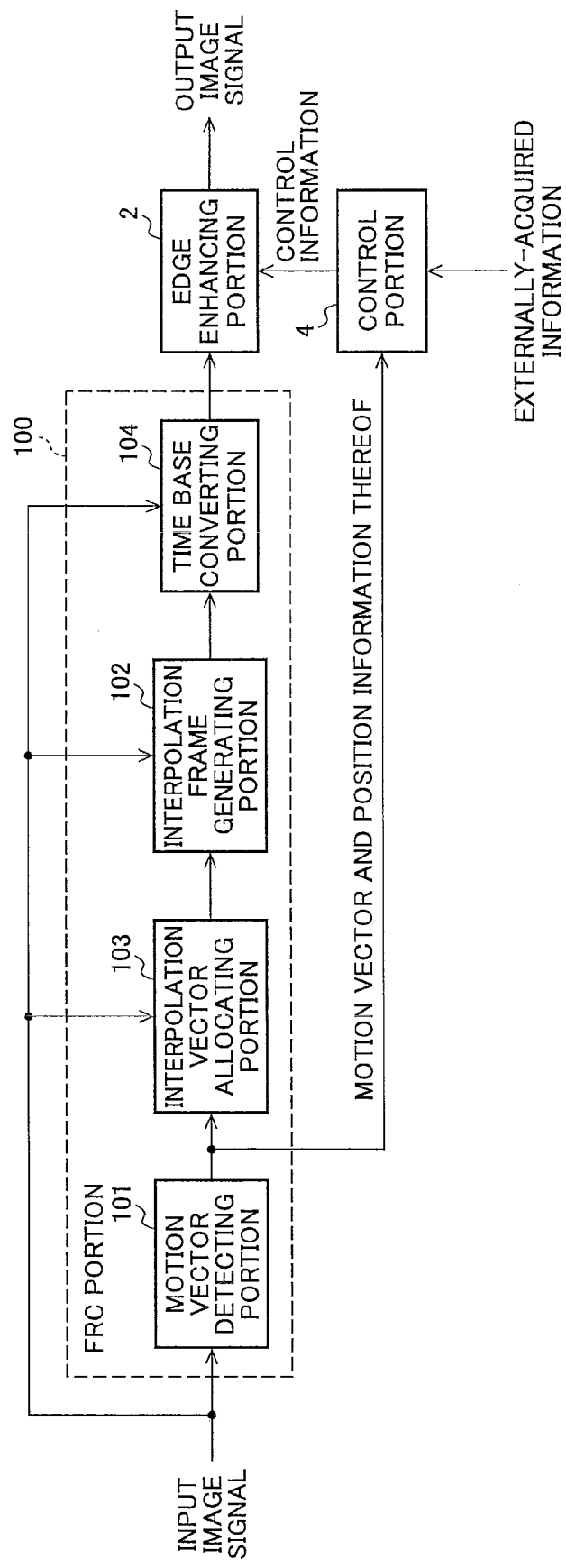
FIG. 14 is a functional block diagram of a schematic configuration of an image display device according to a fifth embodiment of the present invention.
Figure 15:
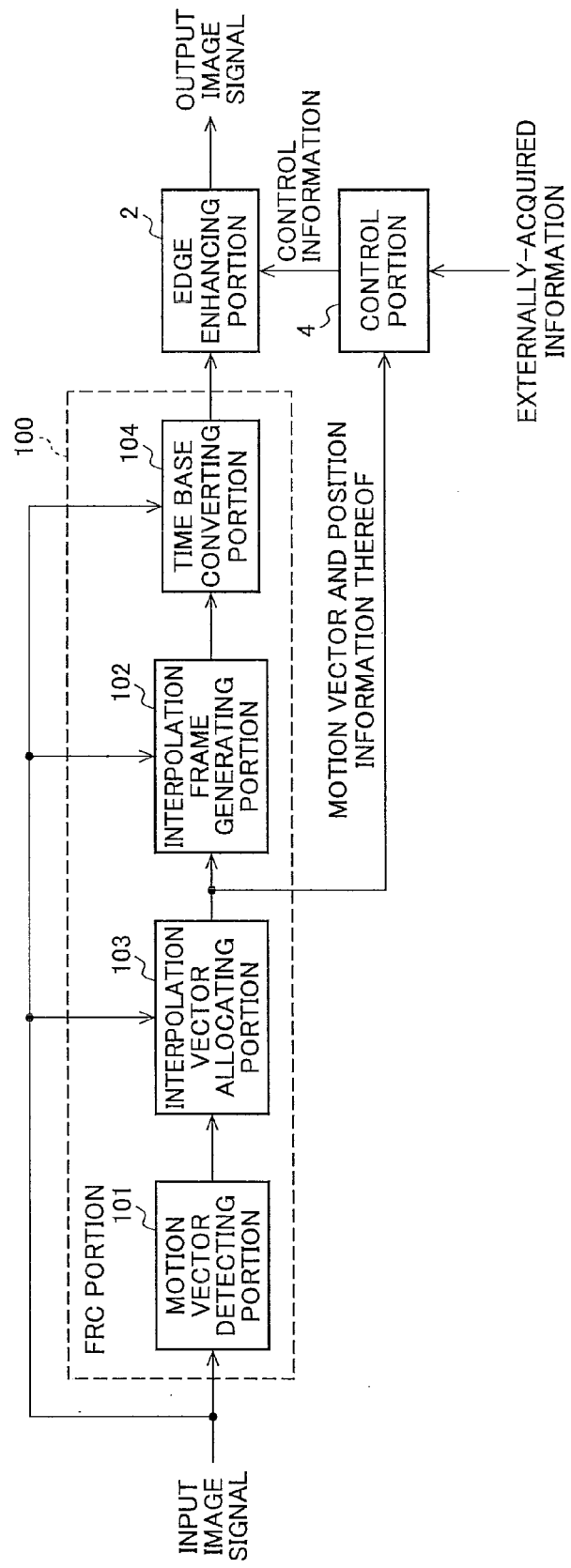
FIG. 15 is a functional block diagram of a schematic configuration of an image display device according to a sixth embodiment of the present invention.

An image display device according to the fifth embodiment of the present invention will be described with reference to FIG. 14, and the portions same as the above image display device are given the same reference numerals and will not be described. FIG. 14 is a functional block diagram of a schematic configuration of the image display device of this embodiment.

As shown in FIG. 14, the image display device of this embodiment includes an FRC portion 100 that converts the number of frames of the input image signal by interpolating image signals subjected to a motion compensation processing between frames or fields of the input video signal and the edge enhancing portion 2 that enhances a high-frequency component of the image signal converted in the number of frames by the FRC portion 100. The image display device also includes the control portion 4 that controls the edge enhancement processing of the edge enhancing portion 2 to vary a level of enhancement of the high-frequency component and a frequency range of enhancement based on a motion amount of the input image signal and externally-acquired information acquired from the outside of the device.

The FRC portion 100 includes a motion vector detecting portion 101 that detects a motion vector from the input image signal of the previous frame and the input image signal of the current frame, an interpolation vector allocating portion 103 that evaluates the motion vectors detected by the motion vector detecting portion 101 to allocate an optimum interpolation vector to an interpolation block between frames based on the evaluation result, an interpolation frame generating portion 102 that generates an interpolation frame with the use of the input image signal of the previous frame and the input image signal of the current frame based on the interpolation vector input from the interpolation vector allocating portion 103, and a time base converting portion 104 that alternately outputs the input frames and the interpolation frames to output the image signal having the frame rate doubled from the original input image signal.

The control portion 4 performs control to increase the edge enhancement level of the edge enhancement processing in the area having a larger motion amount of the input image signal based on the motion vector detected by the motion vector detecting portion 101 of the FRC portion 100 and to reduce the edge enhancement level of the edge enhancement processing or not to execute the edge enhancement processing if it is recognized that the high-frequency component included in the input image signal is not attenuated in the course of generation of the input image signal even in the area having a larger motion amount of the input image signal from the externally-acquired information such as genre information, CG composite information, camera information or image tone mode information.

The image signal motion-adaptively subjected to the sharpening processing by the edge enhancing portion 2 is displayed and output by a display device (not shown) such as a liquid crystal display panel separately or integrally configured. This enables apparent motion blurs to be reduced to improve the sharpness of the displayed image. In the case of application to the image display devices having the holding-type display characteristics, a high-definition displayed video may be implemented by reducing both the motion blurs of a displayed video due to the time integration effect of an image sensor and the motion blurs due to the holding-type display characteristics.

Although the embodiment has a configuration that the edge enhancing portion 2 executes the edge enhancement processing both to the input image signal and to the interpolation image signal generated by the interpolation frame generating portion 102 of the FRC portion 100, this is not a limitation and the edge enhancement processing may be executed only to, at least, either the input image signal or the interpolation image signal. This enables the reduction of the processing amount in the edge enhancing portion 2.

Although the embodiment is configured with the edge enhancing portion 2 executing the edge enhancement processing both to the input image signal and to the interpolation image signal generated by the interpolation frame generating portion 102 of the FRC portion 100, the edge enhancement processing to the input image signal may be different from the edge enhancement processing for the interpolation image signal.

Since image deterioration (image collapse) may occur in the interpolation image signal due to false detection of the motion vector, etc., and if the edge enhancement processing is executed to such a deteriorated interpolation image, a portion having the image deterioration is subjected to the edge enhancement processing and the image deterioration is emphasized, the motion blurs due to the time integration effect of an image sensor may apparently be reduced without making the image deterioration noticeable due to the motion-compensated frame rate conversion processing to improve the sharpness of the displayed image by making the edge enhancement level for the interpolation image signal lower than the edge enhancement level for the input image signal (original image signal) or disabling only the edge enhancement processing to the interpolation image signal.

For example, by reducing the frequency range enhanced for the interpolation image signal to be smaller than the frequency range enhanced for the input image signal (original image signal), the motion blurs due to the time integration effect of an image sensor may apparently be reduced without making the image deterioration noticeable due to the motion-compensated frame rate conversion processing to improve the sharpness of the displayed image.

As described above, the image display device of the embodiment is capable of apparently reducing the motion blurs due to the time integration effect of an image sensor to improve the sharpness of the displayed image and preventing the image deterioration due to excessive edge enhancement by appropriately controlling the edge enhancement processing of the edge enhancing portion 2 depending on the motion amount of the input image signal acquired by the FRC unit 100 and the externally-acquired information acquired from the outside.

Since the edge enhancement processing is executed at a first edge enhancement level to the input image signal and the edge enhancement processing is executed at a second edge enhancement level lower than the first edge enhancement level or no edge enhancement processing is executed to the interpolation image signal, even if the image deterioration occurs in the interpolation image signal, the sharpness of the displayed image may be improved without making the image deterioration noticeable.

It is desirable to prevent the artifacts generated due to an abrupt change in the edge enhancement processing within a screen by providing a low-pass filter for the motion vector between the motion vector detecting portion 10 and the edge enhancing portion 2 to smooth a change in the motion vector within the screen, as described above. In the case of this embodiment, since the edge enhancement processing is executed after the FRC processing, the motion vector detecting processing in the motion vector detecting portion 101 of the FRC portion 100 may stably operate without being affected by the edge enhancement processing.

Sixth Embodiment

An image display device according to a second embodiment of the present invention will be described with reference to FIG. 12, and the portions that are the same as those in the above image display device are given the same reference numerals and will not be described. FIG. 12 is a functional block diagram of a schematic configuration of the image display device of this embodiment.

The image display device of this embodiment includes the FRC portion 100 that converts the number of frames of the input image signal by interpolating image signals subjected to the motion compensation processing between frames or fields of the input video signal and the edge enhancing portion 2 that enhances a high-frequency component of the image signal converted in the number of frames by the FRC portion 100, in the sane way as the fifth embodiment. Although the edge enhancement processing of the edge enhancing portion 2 is variably controlled based on the motion vector detected by the motion vector detecting portion 101 and the externally-acquired information acquired from the outside in the fifth embodiment, this embodiment is configured to variably control the edge enhancement processing of the edge enhancing portion 2 based on an interpolation vector evaluated/allocated by the interpolation vector allocating portion 103 and the externally-acquired information acquired from the outside.

An interpolation vector allocation processing will be described. It is assumed that the motion vector detected by the motion vector detecting portion 101 is a motion vector for an input image signal n−1 of the previous frame. For each of the motion vector detection blocks of the input image signal n−1, the motion vector of each of the motion vector detection blocks indicates a position to which the block has moved in an input image signal n of the next frame. For example, if a frame rate is doubled, the temporal position of the interpolation frame is an intermediate position between the input image signal n−1 and the input image signal n. Therefore, processing is executed to obtain what block on the interpolation frame each of the motion vectors of the input image signal n−1 sticks in when the motion vectors are advanced to the temporal position of the interpolation frame and to allocate the motion vectors to the stuck blocks. This is the interpolation vector allocating processing to the interpolation frame.

The interpolation blocks allocated with appropriate interpolation vectors by the interpolation vector allocating portion 103 are normally set by further dividing the motion vector detection block for detecting the motion vector with the motion vector detecting unit 101. For example, if the motion vector detecting block has 8×8 pixels, the interpolation block is set to have 2×4 pixels obtained by further dividing the motion vector detecting block into eight parts.

The interpolation vector allocating portion 103 allocates a more appropriate interpolation vector to the interpolation block by calculating a difference value (referred to as DFD (Displaced Field Difference)) between image information of a detected block and image information of a block indicated by the motion vector from the detected block to evaluate the accuracy of the motion vector obtained by the motion vector detecting portion 101. The DFD is an index indicative of a degree of accuracy of a candidate vector and a smaller DFD value indicates that a detected block matches better with a block pointed by a motion vector from the detected block and that a corresponding candidate vector is more appropriate.

Therefore, since the edge enhancing portion 2 varies the level of enhancement of the high-frequency component and the enhanced frequency range using interpolation vector obtained by the interpolation vector allocating portion 103 of the FRC portion 100 in this embodiment, the edge enhancement processing may more finely and appropriately be executed at least to the interpolation image signal of the output image signal of the FRC portion 100.

Although the embodiment has a configuration that the edge enhancing portion 2 executes the edge enhancement processing both to the input image signal and to the interpolation image signal generated by the interpolation frame generating portion 102 of the FRC portion 100, this is not a limitation and the edge enhancement processing may be executed only to, at least, either the input image signal or the interpolation image signal. This enables the reduction of the processing amount in the edge enhancing portion 2.

Although the embodiment has a configuration that the edge enhancing portion 2 executes the edge enhancement processing both to the input image signal and to the interpolation image signal generated by the interpolation frame generating portion 102 of the FRC portion 100, the edge enhancement processing to the input image signal may be different from the edge enhancement processing to the interpolation image signal.

Since image deterioration (image collapse) may occur in the interpolation image signal due to false detection of the motion vector, etc., and if the edge enhancement processing is executed to such a deteriorated interpolation image, a portion having the image deterioration is subjected to the edge enhancement processing and the image deterioration becomes noticeable, the motion blurs due to the time integration effect of an image sensor may apparently be reduced without making the image deterioration noticeable due to the motion-compensated frame rate conversion processing to improve the sharpness of the displayed image by making the edge enhancement level for the interpolation image signal lower than the edge enhancement level for the input image signal (original image signal) or disabling only the edge enhancement processing for the interpolation image signal.

For example, by reducing the frequency range to be emphasized to the interpolation image signal to be smaller than the frequency range to be emphasized to the input image signal (original image signal), the motion blurs due to the time integration effect of an image sensor may apparently be reduced without making the image deterioration noticeable due to the motion-compensated frame rate conversion processing to improve the sharpness of the displayed image.

As described above, the image display device of the embodiment is capable of apparently reducing the motion blurs due to the time integration effect of an image sensor to improve the sharpness of the displayed image and preventing the image deterioration due to excessive edge enhancement by appropriately controlling the edge enhancement processing of the edge enhancing portion 2 depending on the motion amount of the input image signal acquired by the FRC unit 100 and the externally-acquired information such as genre information, CG composite information, camera information or image tone mode information.

Since the edge enhancement processing is executed at a first edge enhancement level for the input image signal and the edge enhancement processing is executed at a second edge enhancement level lower than the first edge enhancement level or no edge enhancement processing is executed to the interpolation image signal, even if the image deterioration occurs in the interpolation image signal, the sharpness of the displayed image may be improved without making the image deterioration noticeable.

It is desirable to prevent the artifacts generated due to an abrupt change in the edge enhancement processing within a screen by providing a low-pass filter for the interpolation vector between the interpolation vector allocating portion 103 and the edge enhancing portion 2 to smooth a change in the motion vector within the screen as described above. In the case of this embodiment, the motion vector detection processing in the motion vector detecting portion 101 of the FRC portion 100 may stably operate without being affected by the edge enhancement processing.

The invention claimed is:
1. An image display device comprising:
a detecting portion that detects a motion amount of an input image signal; and
an edge enhancing portion that executes edge enhancement processing to the input image signal, and
increasing an edge enhancement level of the edge enhancement processing to an area having a larger motion amount of the input image signal, wherein
a control portion is included that reduces the edge enhancement level of the edge enhancement processing or does not execute the edge enhancement processing if it is recognized that a high-frequency component included in the input image signal is not attenuated in the course of generation of the input image signal even in the area having a larger motion amount of the input image signal based on genre information indicative of a content type that the input image signal belongs to.

2. An image display device comprising:
a detecting portion that detects a motion amount of an input image signal; and
an edge enhancing portion that executes edge enhancement processing to the input image signal, and
increasing an edge enhancement level of the edge enhancement processing to an area having a larger motion amount of the input image signal, wherein
a control portion is included that reduces the edge enhancement level of the edge enhancement processing or does not execute the edge enhancement processing in an area where combined with a computer graphic image based on CG composite position information indicative of a screen area position where combined with a computer graphic image is combined with the input image signal.

3. An image display device comprising:
a detecting portion that detects a motion amount of an input image signal; and
an edge enhancing portion that executes edge enhancement processing to the input image signal, and
increasing an edge enhancement level of the edge enhancement processing to an area having a larger motion amount of the input image signal, wherein
a control portion is included that reduces the edge enhancement level of the edge enhancement processing or does not execute the edge enhancement processing if a depth of field is shallow even in the area having a larger motion amount of the input image signal based on camera information indicative of the depth of field at the time of generation of the input image signal using an imaging device.

4. An image display device comprising:
a detecting portion that detects a motion amount of an input image signal; and
an edge enhancing portion that executes edge enhancement processing to the input image signal, and
increasing an edge enhancement level of the edge enhancement processing to an area having a larger motion amount of the input image signal, wherein
a control portion is included that reduces the edge enhancement level of the edge enhancement processing or does not execute the edge enhancement processing if it is recognized that a high-frequency component included in the input image signal is not attenuated in the course of generation of the input image signal even in the area having a larger motion amount of the input image signal based on image tone mode information indicative of an image tone mode selected and indicated by a user from among a plurality of image tone modes prearranged for setting and adjusting an image quality of a displayed image.

5. An image display method comprising:
a detecting step for detecting a motion amount of an input image signal; and
an edge enhancing step for executing edge enhancement processing to the input image signal, and
increasing an edge enhancement level of the edge enhancement processing to an area having a larger motion amount of the input image signal, wherein
the edge enhancement level of the edge enhancement processing is reduced or the edge enhancement processing is not executed if it is recognized that a high-frequency component included in the input image signal is not attenuated in the course of generation of the input image signal even in the area having a larger motion amount of the input image signal based on genre information indicative of a content type that the input image signal belongs to.

6. An image display method comprising:
a detecting step for detecting a motion amount of an input image signal; and
an edge enhancing step for executing edge enhancement processing to the input image signal, and
increasing an edge enhancement level of the edge enhancement processing to an area having a larger motion amount of the input image signal, wherein
a control portion is included that reduces the edge enhancement level of the edge enhancement processing or does not execute the edge enhancement processing in an area where combined with a computer graphic image based on CG composite position information indicative of a screen area position where a computer graphic image is combined with the input image signal, and
the edge enhancement level of the edge enhancement processing is reduced or the edge enhancement processing is not executed if it is recognized that a high-frequency component included in the input image signal is not attenuated in the course of generation of the input image signal even in the area having a larger motion amount of the input image signal based on CG composite information indicative of a screen area position combined with a computer graphic image in the input image signal.

7. An image display method comprising:
a detecting step of detecting a motion amount of an input image signal; and
an edge enhancing step of executing edge enhancement processing for the input image signal,
the image display method of increasing an edge enhancement level of the edge enhancement processing for an area having a larger motion amount of the input image signal,
the image display method comprising reducing the edge enhancement level of the edge enhancement processing or not executing the edge enhancement processing if a depth of field is shallow even in the area having a larger motion amount of the input image signal based on camera information indicative of the depth of field at the time of generation of the input image signal using an imaging device.

8. An image display method comprising:
a detecting step for detecting a motion amount of an input image signal; and
an edge enhancing step for executing edge enhancement processing to the input image signal, and
increasing an edge enhancement level of the edge enhancement processing to an area having a larger motion amount of the input image signal, wherein
the edge enhancement level of the edge enhancement processing is reduced or the edge enhancement processing is not executed if it is recognized that a high-frequency component included in the input image signal is not attenuated in the course of generation of the input image signal even in the area having a larger motion amount of the input image signal based on image tone mode information indicative of an image tone mode selected and indicated by a user from among a plurality of image tone modes prearranged for setting and adjusting an image quality of a displayed image.

* * * * *